US010757103B2

(12) United States Patent
Irwan et al.

(10) Patent No.: US 10,757,103 B2
(45) Date of Patent: Aug. 25, 2020

(54) SINGLE AUTHENTICATION PORTAL FOR DIVERSE INDUSTRIAL NETWORK PROTOCOLS ACROSS MULTIPLE OSI LAYERS

(71) Applicant: XAGE SECURITY, INC., Palo Alto, CA (US)

(72) Inventors: Susanto Junaidi Irwan, San Francisco, CA (US); Ganesh B. Jampani, Gilroy, CA (US); Andy Sugiarto, Moraga, CA (US)

(73) Assignee: Xage Security, Inc., Palo Alto, CA (US)

( * ) Notice: Subject to any disclaimer, the term of this patent is extended or adjusted under 35 U.S.C. 154(b) by 259 days.

(21) Appl. No.: 15/485,047

(22) Filed: Apr. 11, 2017

(65) Prior Publication Data

US 2019/0245856 A1 Aug. 8, 2019

(51) Int. Cl.
*H04L 29/06* (2006.01)
*G06F 15/16* (2006.01)
(Continued)

(52) U.S. Cl.
CPC .......... *H04L 63/0884* (2013.01); *G06F 15/16* (2013.01); *G06F 15/76* (2013.01);
(Continued)

(58) Field of Classification Search
CPC . H04L 63/0884; H04L 9/0643; H04L 63/101; H04L 63/105; H04L 2463/121
See application file for complete search history.

(56) References Cited

U.S. PATENT DOCUMENTS 9,589,397 B1 3/2017 Christopher et al.
2008/0046984 A1 2/2008 Bohmer et al.
(Continued)

OTHER PUBLICATIONS

International Searching Authority, "Search Report" in application No. PCT/US18/22716, dated May 16, 2018, 15 pages.
(Continued)

*Primary Examiner* — Trang T Doan
*Assistant Examiner* — Jessica J South
(74) *Attorney, Agent, or Firm* — Hickman Palermo Becker Bingham LLP

(57) ABSTRACT

In an embodiment, a computer-implemented method comprises, receiving an authentication request from a first computing device; in response to receiving the authentication request from the first computing device, performing one or more authentication services on behalf of a second computing device using identity information that is stored in a first data repository; generating, based on data from an access control list maintained at the second computing device, a list of one or more third computing devices; receiving a request from the first computing device to access a third computing device in the list of one or more third computing devices; generating service identity information for authenticating to the third computing device and storing the service identity information in a second data repository; and performing one or more authentication services on behalf of the first computing device using the service identity information that is stored in the second data repository.

27 Claims, 15 Drawing Sheets

(51) Int. Cl.

| | |
|---|---|
| ***H04W 12/06*** | (2009.01) |
| ***G06F 15/76*** | (2006.01) |
| ***H04W 12/08*** | (2009.01) |
| ***H04L 9/32*** | (2006.01) |
| ***H04L 9/06*** | (2006.01) |

(52) U.S. Cl.

CPC ............ *H04L 9/0643* (2013.01); *H04L 9/321* (2013.01); *H04L 9/3236* (2013.01); *H04L 9/3271* (2013.01); *H04L 9/3297* (2013.01); *H04L 63/101* (2013.01); *H04L 63/105* (2013.01); *H04W 12/06* (2013.01); *H04W 12/08* (2013.01); *H04L 2209/38* (2013.01); *H04L 2463/121* (2013.01)

(56) References Cited

U.S. PATENT DOCUMENTS

2012/0190325 A1* 7/2012 Abu-Hakima .......... H04W 4/90 455/404.2
2014/0040431 A1* 2/2014 Rao ..................... G06F 16/2282 709/219
2014/0331060 A1* 11/2014 Hayton ................... G06F 21/31 713/186
2015/0286833 A1* 10/2015 Resch ................. G06F 21/6218 726/29
2016/0173473 A1* 6/2016 Naccache ........... H04W 12/003 726/5
2016/0241403 A1 8/2016 Lindemann
2016/0330182 A1 11/2016 Jeon et al.
2016/0358158 A1 12/2016 Radocchia et al.
2017/0041316 A1 2/2017 Setchell et al.
2017/0094706 A1 3/2017 Kim et al.
2017/0111336 A1* 4/2017 Davis ...................... H04L 67/02
2018/0019867 A1* 1/2018 Davis .................... H04L 9/3239
2018/0124600 A1* 5/2018 Chen ..................... H04W 12/06
2018/0131685 A1* 5/2018 Sridhar ................. H04L 9/3247
2018/0278607 A1* 9/2018 Loladia ............... H04L 41/0893

OTHER PUBLICATIONS

Current Claims in application No. PCT/US18/2271, dated May 2018, 7 pages.

* cited by examiner 100
110 ENTERPRISE SERVICES
120 IDENTITY AND ACCESS MANAGEMENT ( IAM)
122 DATA REPOSITORY
122 DATA REPOSITORY
122 DATA REPOSITORY
130 SECURITY BROKER
140 NETWORK
155 COMPUTER
150 BLOCKCHAIN
155 COMPUTER
150 BLOCKCHAIN
160 DISTRIBUTION SERVICES
161 CLIENT DEVICE
161 CLIENT DEVICE
161 CLIENT DEVICE
170 SECURITY GATEWAY
180 ENTERPRISE DEVICE
180 ENTERPRISE DEVICE
180 ENTERPRISE DEVICE

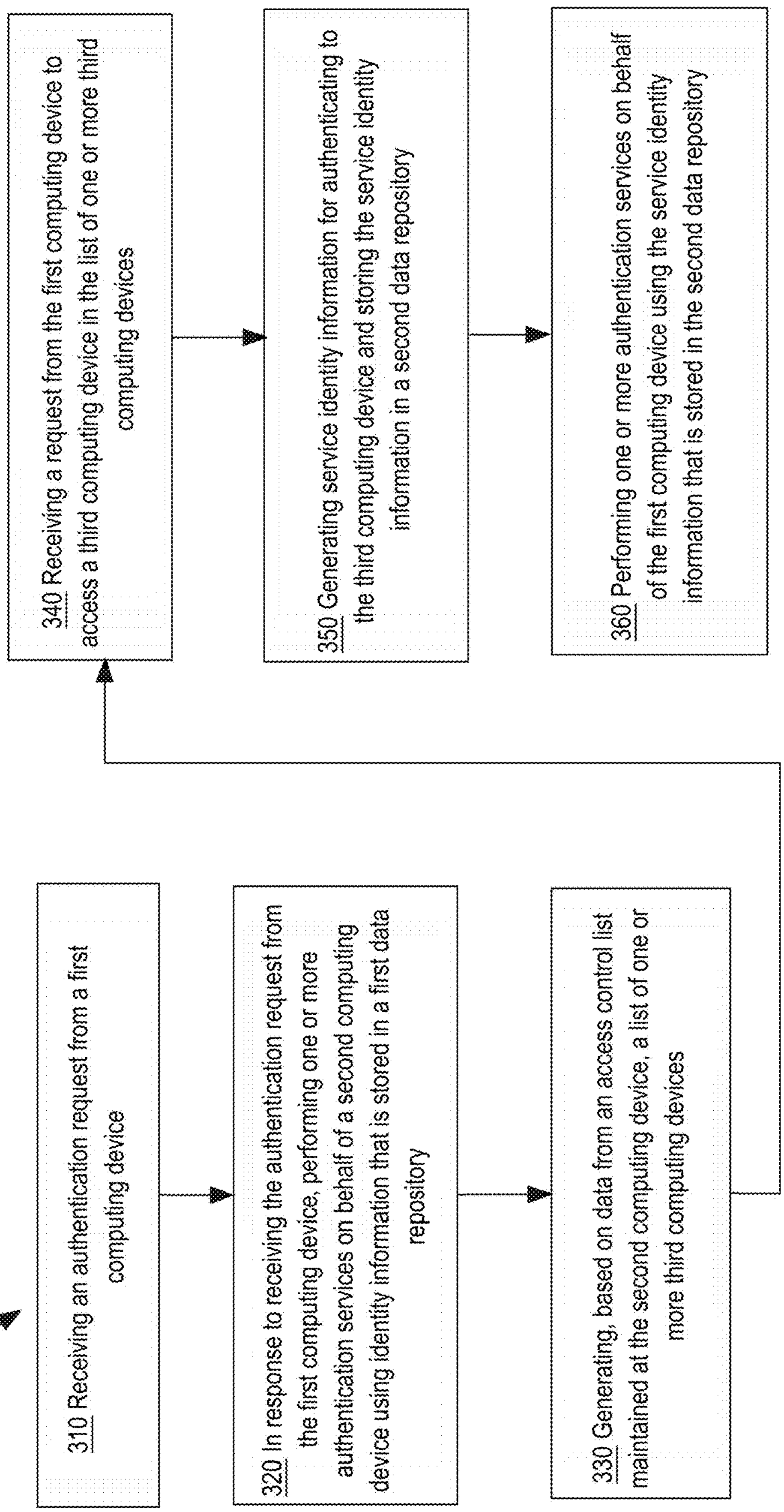
FIG. 3
300
310 Receiving an authentication request from a first computing device
320 In response to receiving the authentication request from the first computing device, performing one or more authentication services on behalf of a second computing device using identity information that is stored in a first data repository
330 Generating, based on data from an access control list maintained at the second computing device, a list of one or more third computing devices
340 Receiving a request from the first computing device to access a third computing device in the list of one or more third computing devices
350 Generating service identity information for authenticating to the third computing device and storing the service identity information in a second data repository
360 Performing one or more authentication services on behalf of the first computing device using the service identity information that is stored in the second data repository

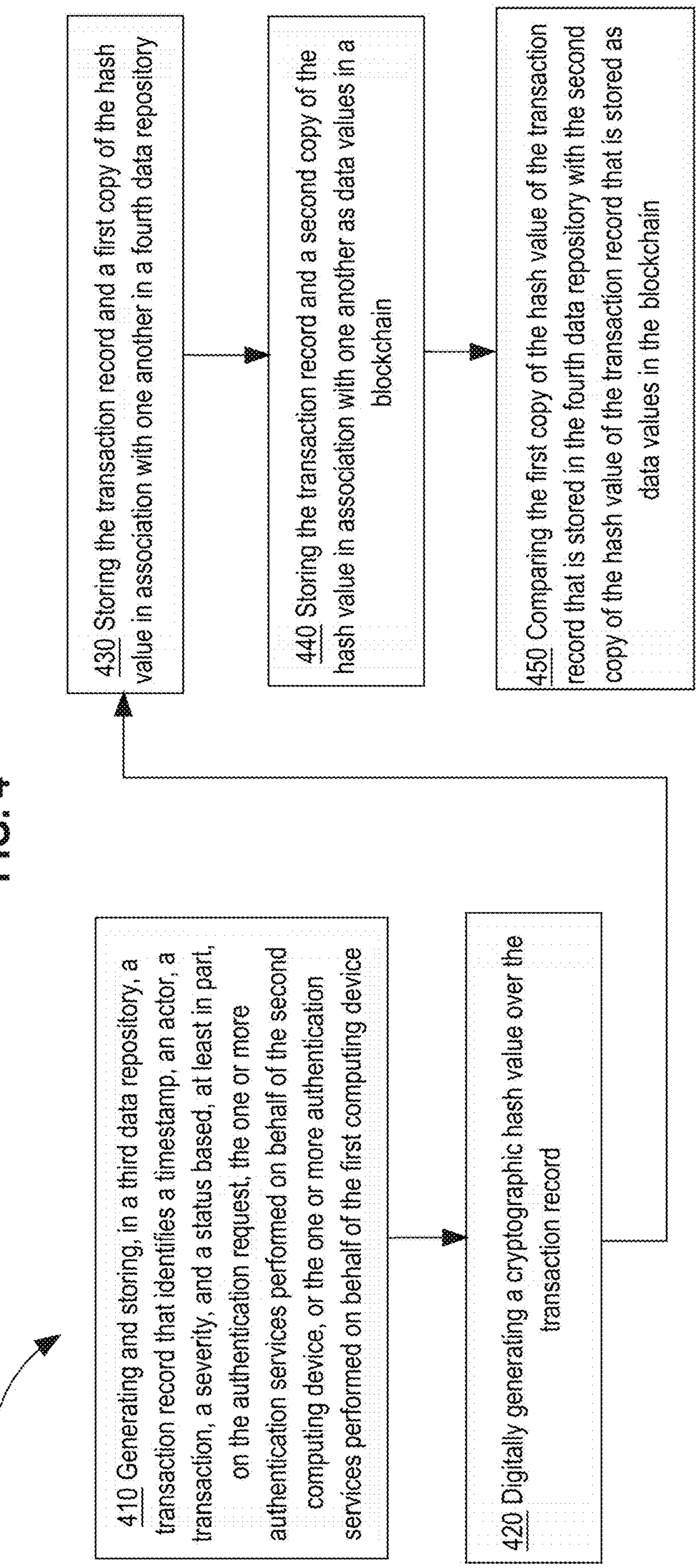

FIG. 4
400
410 Generating and storing, in a third data repository, a transaction record that identifies a timestamp, an actor, a transaction, a severity, and a status based, at least in part, on the authentication request, the one or more authentication services performed on behalf of the second computing device, or the one or more authentication services performed on behalf of the first computing device
420 Digitally generating a cryptographic hash value over the transaction record
430 Storing the transaction record and a first copy of the hash value in association with one another in a fourth data repository
440 Storing the transaction record and a second copy of the hash value in association with one another as data values in a blockchain
450 Comparing the first copy of the hash value of the transaction record that is stored in the fourth data repository with the second copy of the hash value of the transaction record that is stored as data values in the blockchain

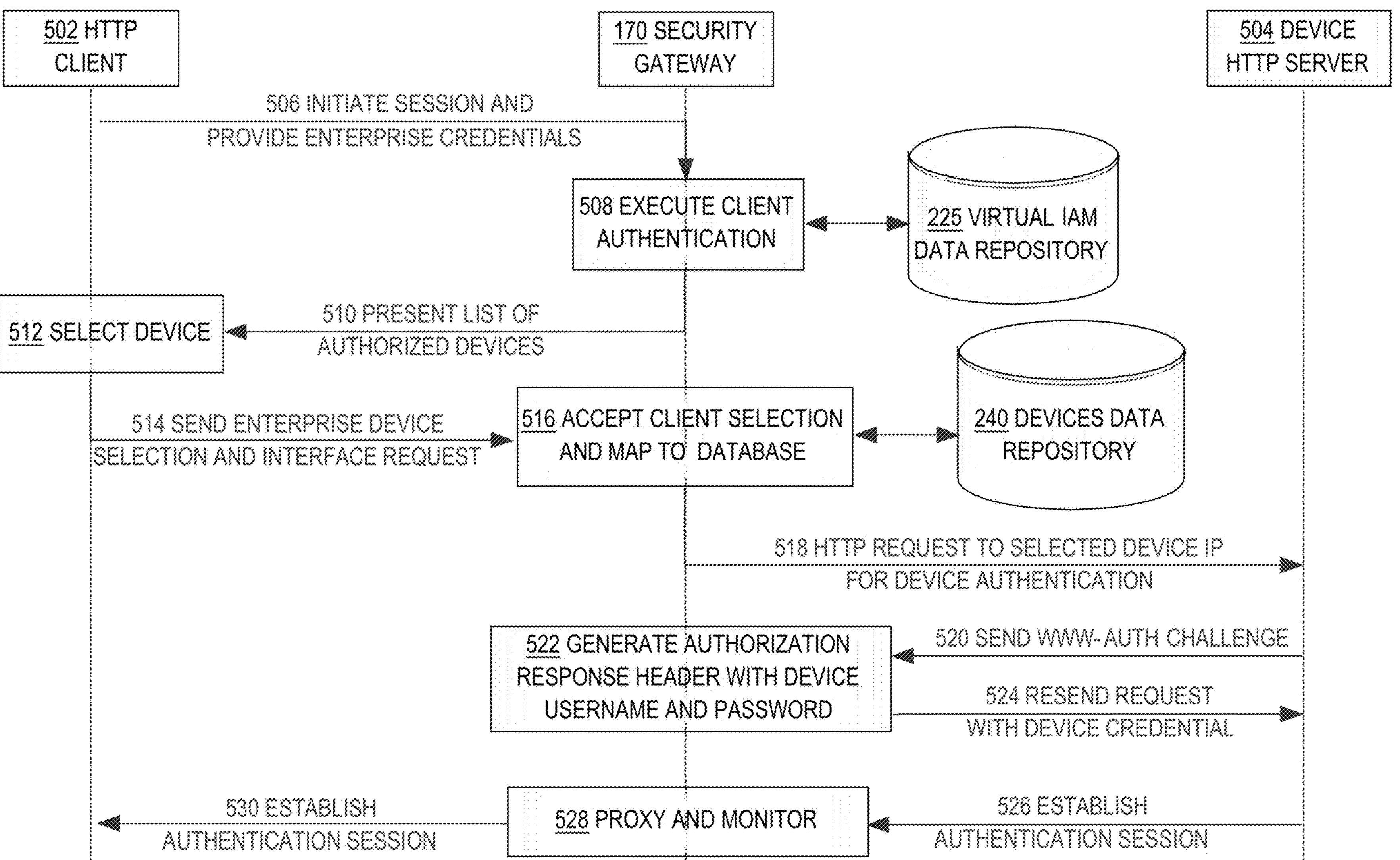
FIG. 5
500
502 HTTP CLIENT
170 SECURITY GATEWAY
504 DEVICE HTTP SERVER
506 INITIATE SESSION AND PROVIDE ENTERPRISE CREDENTIALS
508 EXECUTE CLIENT AUTHENTICATION
225 VIRTUAL IAM DATA REPOSITORY
510 PRESENT LIST OF AUTHORIZED DEVICES
512 SELECT DEVICE
514 SEND ENTERPRISE DEVICE SELECTION AND INTERFACE REQUEST
516 ACCEPT CLIENT SELECTION AND MAP TO DATABASE
240 DEVICES DATA REPOSITORY
518 HTTP REQUEST TO SELECTED DEVICE IP FOR DEVICE AUTHENTICATION
520 SEND WWW- AUTH CHALLENGE
522 GENERATE AUTHORIZATION RESPONSE HEADER WITH DEVICE USERNAME AND PASSWORD
524 RESEND REQUEST WITH DEVICE CREDENTIAL
530 ESTABLISH AUTHENTICATION SESSION
528 PROXY AND MONITOR
526 ESTABLISH AUTHENTICATION SESSION

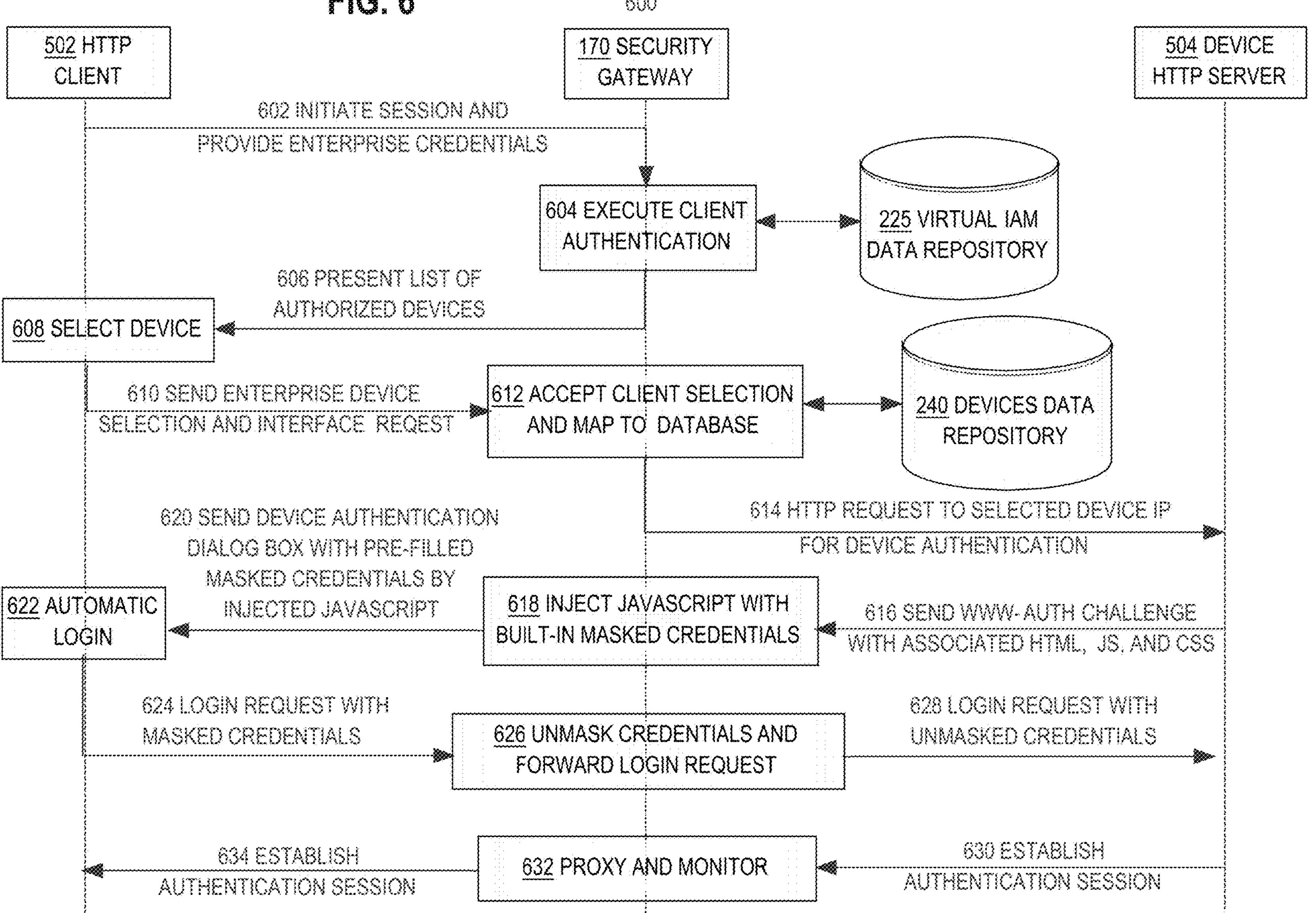

FIG. 6
600
502 HTTP CLIENT
170 SECURITY GATEWAY
504 DEVICE HTTP SERVER
602 INITIATE SESSION AND PROVIDE ENTERPRISE CREDENTIALS
604 EXECUTE CLIENT AUTHENTICATION
225 VIRTUAL IAM DATA REPOSITORY
606 PRESENT LIST OF AUTHORIZED DEVICES
608 SELECT DEVICE
610 SEND ENTERPRISE DEVICE SELECTION AND INTERFACE REQEST
612 ACCEPT CLIENT SELECTION AND MAP TO DATABASE
240 DEVICES DATA REPOSITORY
614 HTTP REQUEST TO SELECTED DEVICE IP FOR DEVICE AUTHENTICATION
620 SEND DEVICE AUTHENTICATION DIALOG BOX WITH PRE-FILLED MASKED CREDENTIALS BY INJECTED JAVASCRIPT
622 AUTOMATIC LOGIN
618 INJECT JAVASCRIPT WITH BUILT-IN MASKED CREDENTIALS
616 SEND WWW- AUTH CHALLENGE WITH ASSOCIATED HTML, JS, AND CSS
624 LOGIN REQUEST WITH MASKED CREDENTIALS
626 UNMASK CREDENTIALS AND FORWARD LOGIN REQUEST
628 LOGIN REQUEST WITH UNMASKED CREDENTIALS
634 ESTABLISH AUTHENTICATION SESSION
632 PROXY AND MONITOR
630 ESTABLISH AUTHENTICATION SESSION

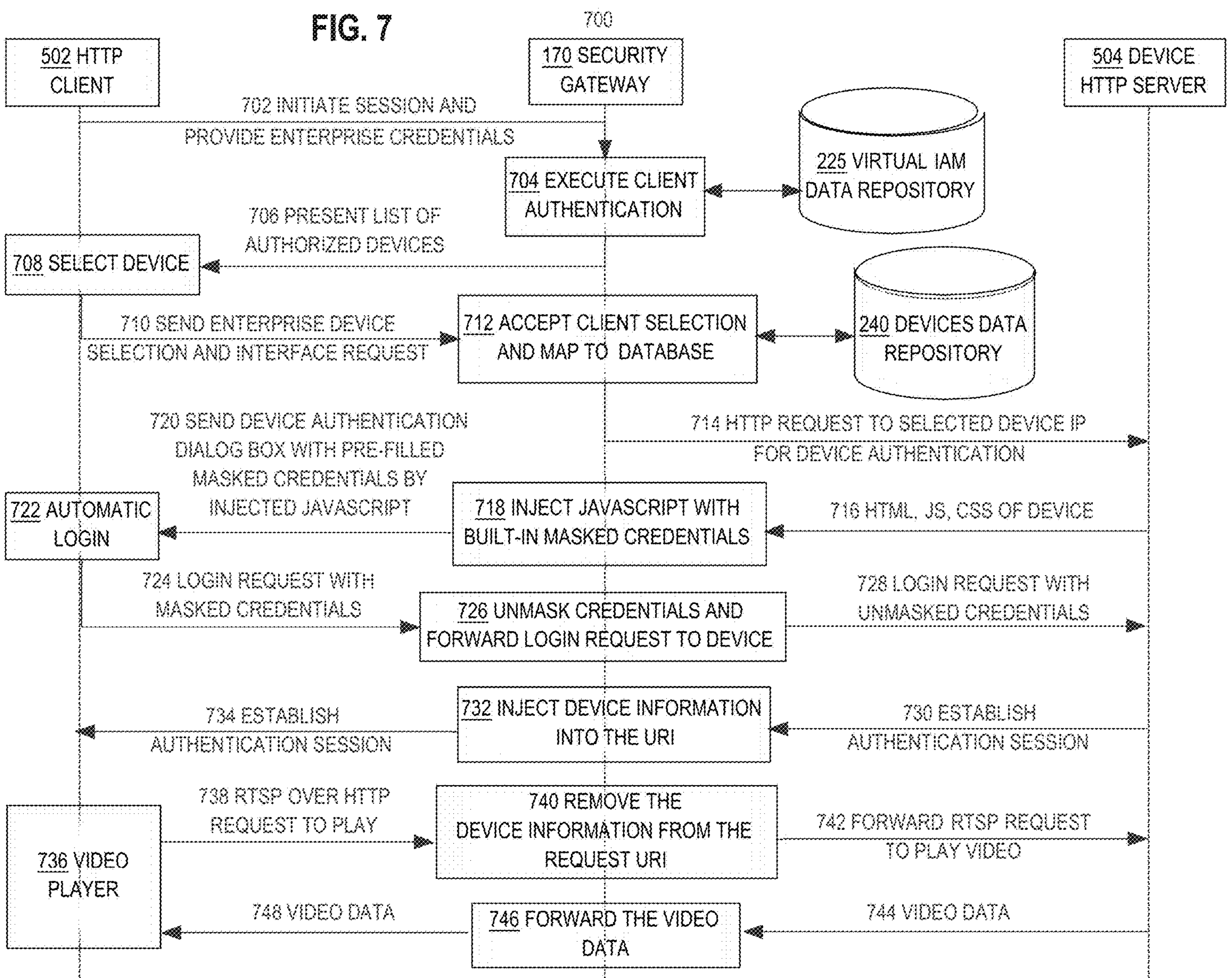
FIG. 7
700
502 HTTP CLIENT
170 SECURITY GATEWAY
504 DEVICE HTTP SERVER
702 INITIATE SESSION AND PROVIDE ENTERPRISE CREDENTIALS
704 EXECUTE CLIENT AUTHENTICATION
225 VIRTUAL IAM DATA REPOSITORY
706 PRESENT LIST OF AUTHORIZED DEVICES
708 SELECT DEVICE
710 SEND ENTERPRISE DEVICE SELECTION AND INTERFACE REQUEST
712 ACCEPT CLIENT SELECTION AND MAP TO DATABASE
240 DEVICES DATA REPOSITORY
720 SEND DEVICE AUTHENTICATION DIALOG BOX WITH PRE-FILLED MASKED CREDENTIALS BY INJECTED JAVASCRIPT
714 HTTP REQUEST TO SELECTED DEVICE IP FOR DEVICE AUTHENTICATION
722 AUTOMATIC LOGIN
718 INJECT JAVASCRIPT WITH BUILT-IN MASKED CREDENTIALS
716 HTML, JS, CSS OF DEVICE
724 LOGIN REQUEST WITH MASKED CREDENTIALS
726 UNMASK CREDENTIALS AND FORWARD LOGIN REQUEST TO DEVICE
728 LOGIN REQUEST WITH UNMASKED CREDENTIALS
734 ESTABLISH AUTHENTICATION SESSION
732 INJECT DEVICE INFORMATION INTO THE URI
730 ESTABLISH AUTHENTICATION SESSION
736 VIDEO PLAYER
738 RTSP OVER HTTP REQUEST TO PLAY
740 REMOVE THE DEVICE INFORMATION FROM THE REQUEST URI
742 FORWARD RTSP REQUEST TO PLAY VIDEO
748 VIDEO DATA
746 FORWARD THE VIDEO DATA
744 VIDEO DATA

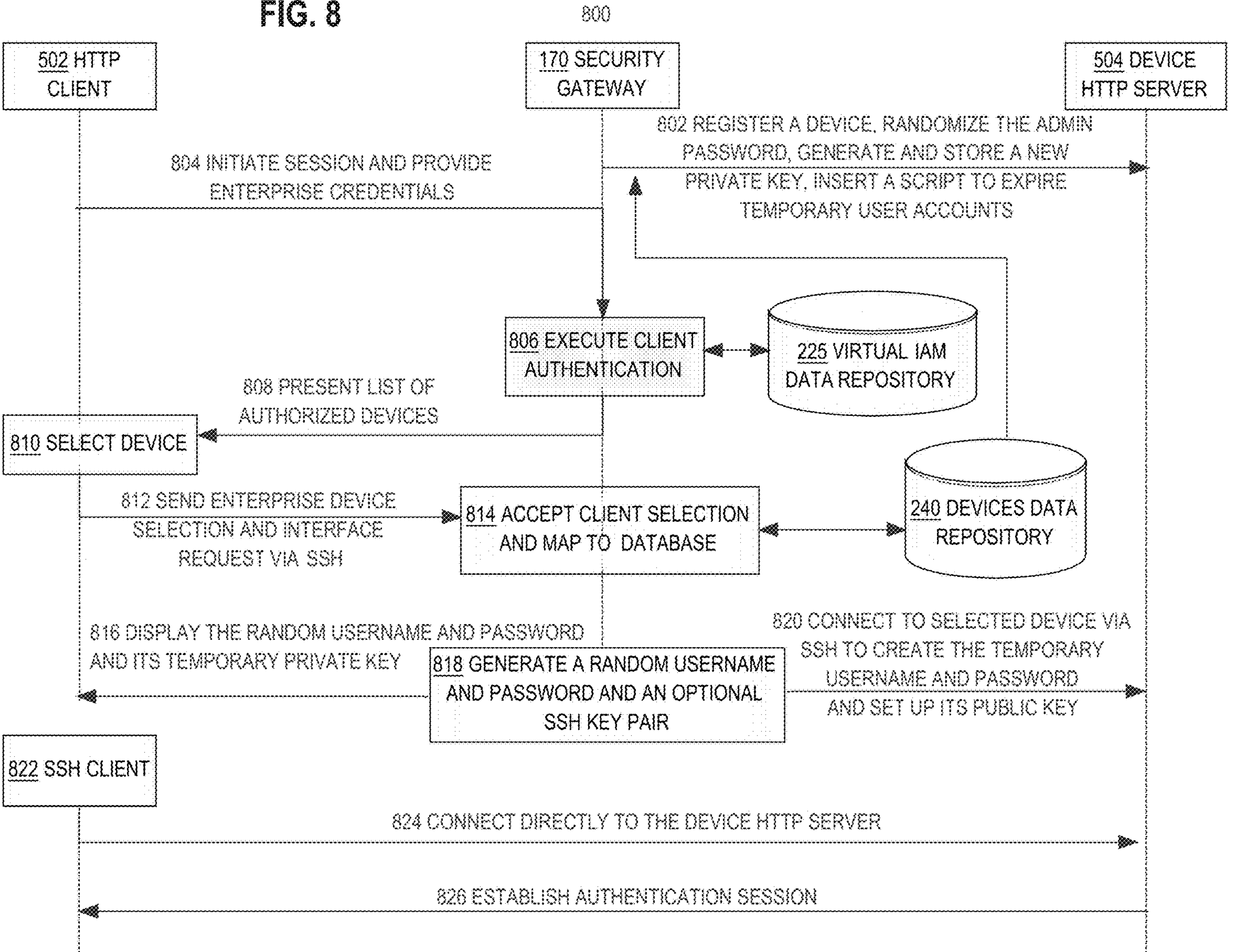

FIG. 8
800
502 HTTP CLIENT
170 SECURITY GATEWAY
504 DEVICE HTTP SERVER
802 REGISTER A DEVICE, RANDOMIZE THE ADMIN PASSWORD, GENERATE AND STORE A NEW PRIVATE KEY, INSERT A SCRIPT TO EXPIRE TEMPORARY USER ACCOUNTS
804 INITIATE SESSION AND PROVIDE ENTERPRISE CREDENTIALS
806 EXECUTE CLIENT AUTHENTICATION
225 VIRTUAL IAM DATA REPOSITORY
808 PRESENT LIST OF AUTHORIZED DEVICES
810 SELECT DEVICE
240 DEVICES DATA REPOSITORY
812 SEND ENTERPRISE DEVICE SELECTION AND INTERFACE REQUEST VIA SSH
814 ACCEPT CLIENT SELECTION AND MAP TO DATABASE
816 DISPLAY THE RANDOM USERNAME AND PASSWORD AND ITS TEMPORARY PRIVATE KEY
818 GENERATE A RANDOM USERNAME AND PASSWORD AND AN OPTIONAL SSH KEY PAIR
820 CONNECT TO SELECTED DEVICE VIA SSH TO CREATE THE TEMPORARY USERNAME AND PASSWORD AND SET UP ITS PUBLIC KEY
822 SSH CLIENT
824 CONNECT DIRECTLY TO THE DEVICE HTTP SERVER
826 ESTABLISH AUTHENTICATION SESSION

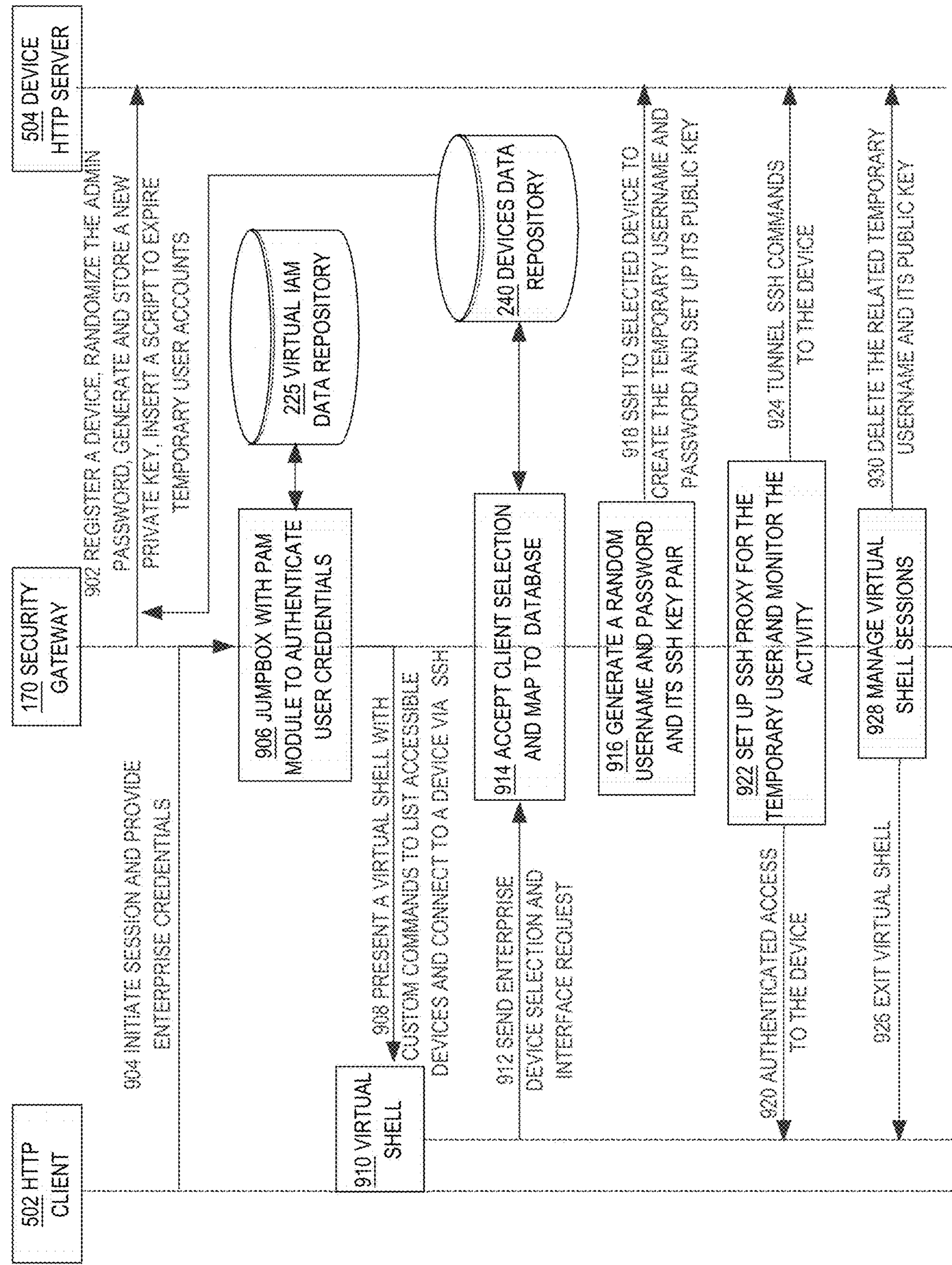
FIG. 9
900
502 HTTP CLIENT
170 SECURITY GATEWAY
504 DEVICE HTTP SERVER
902 REGISTER A DEVICE, RANDOMIZE THE ADMIN PASSWORD, GENERATE AND STORE A NEW PRIVATE KEY, INSERT A SCRIPT TO EXPIRE TEMPORARY USER ACCOUNTS
904 INITIATE SESSION AND PROVIDE ENTERPRISE CREDENTIALS
906 JUMPBOX WITH PAM MODULE TO AUTHENTICATE USER CREDENTIALS
225 VIRTUAL IAM DATA REPOSITORY
240 DEVICES DATA REPOSITORY
908 PRESENT A VIRTUAL SHELL WITH CUSTOM COMMANDS TO LIST ACCESSIBLE DEVICES AND CONNECT TO A DEVICE VIA SSH
910 VIRTUAL SHELL
912 SEND ENTERPRISE DEVICE SELECTION AND INTERFACE REQUEST
914 ACCEPT CLIENT SELECTION AND MAP TO DATABASE
916 GENERATE A RANDOM USERNAME AND PASSWORD AND ITS SSH KEY PAIR
918 SSH TO SELECTED DEVICE TO CREATE THE TEMPORARY USERNAME AND PASSWORD AND SET UP ITS PUBLIC KEY
920 AUTHENTICATED ACCESS TO THE DEVICE
922 SET UP SSH PROXY FOR THE TEMPORARY USER AND MONITOR THE ACTIVITY
924 TUNNEL SSH COMMANDS TO THE DEVICE
926 EXIT VIRTUAL SHELL
928 MANAGE VIRTUAL SHELL SESSIONS
930 DELETE THE RELATED TEMPORARY USERNAME AND ITS PUBLIC KEY

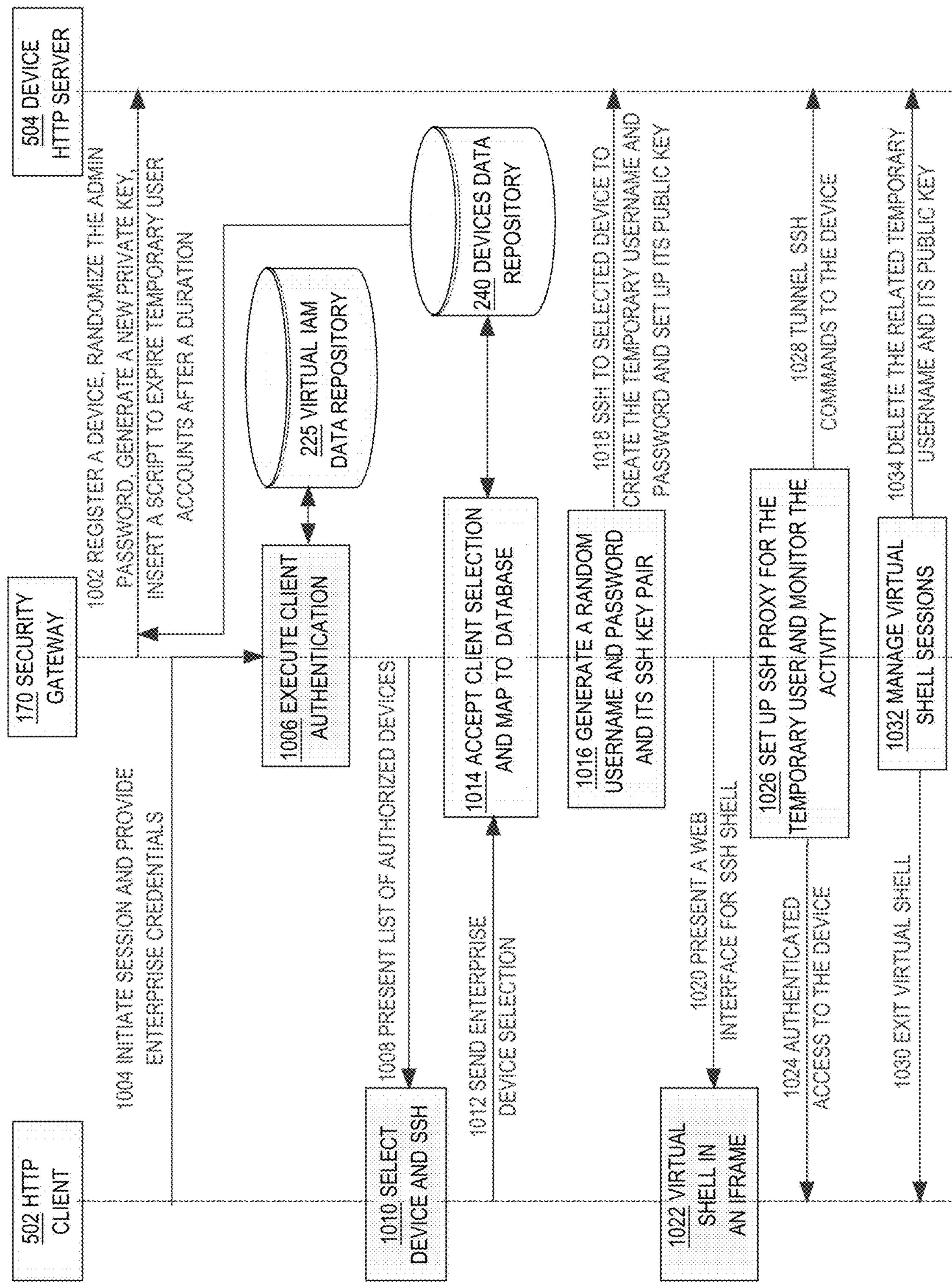

FIG. 10
1000
502 HTTP CLIENT
170 SECURITY GATEWAY
504 DEVICE HTTP SERVER
1002 REGISTER A DEVICE, RANDOMIZE THE ADMIN PASSWORD, GENERATE A NEW PRIVATE KEY, INSERT A SCRIPT TO EXPIRE TEMPORARY USER ACCOUNTS AFTER A DURATION
1004 INITIATE SESSION AND PROVIDE ENTERPRISE CREDENTIALS
1006 EXECUTE CLIENT AUTHENTICATION
225 VIRTUAL IAM DATA REPOSITORY
240 DEVICES DATA REPOSITORY
1008 PRESENT LIST OF AUTHORIZED DEVICES
1010 SELECT DEVICE AND SSH
1012 SEND ENTERPRISE DEVICE SELECTION
1014 ACCEPT CLIENT SELECTION AND MAP TO DATABASE
1016 GENERATE A RANDOM USERNAME AND PASSWORD AND ITS SSH KEY PAIR
1018 SSH TO SELECTED DEVICE TO CREATE THE TEMPORARY USERNAME AND PASSWORD AND SET UP ITS PUBLIC KEY
1020 PRESENT A WEB INTERFACE FOR SSH SHELL
1022 VIRTUAL SHELL IN AN IFRAME
1024 AUTHENTICATED ACCESS TO THE DEVICE
1026 SET UP SSH PROXY FOR THE TEMPORARY USER AND MONITOR THE ACTIVITY
1028 TUNNEL SSH COMMANDS TO THE DEVICE
1030 EXIT VIRTUAL SHELL
1032 MANAGE VIRTUAL SHELL SESSIONS
1034 DELETE THE RELATED TEMPORARY USERNAME AND ITS PUBLIC KEY

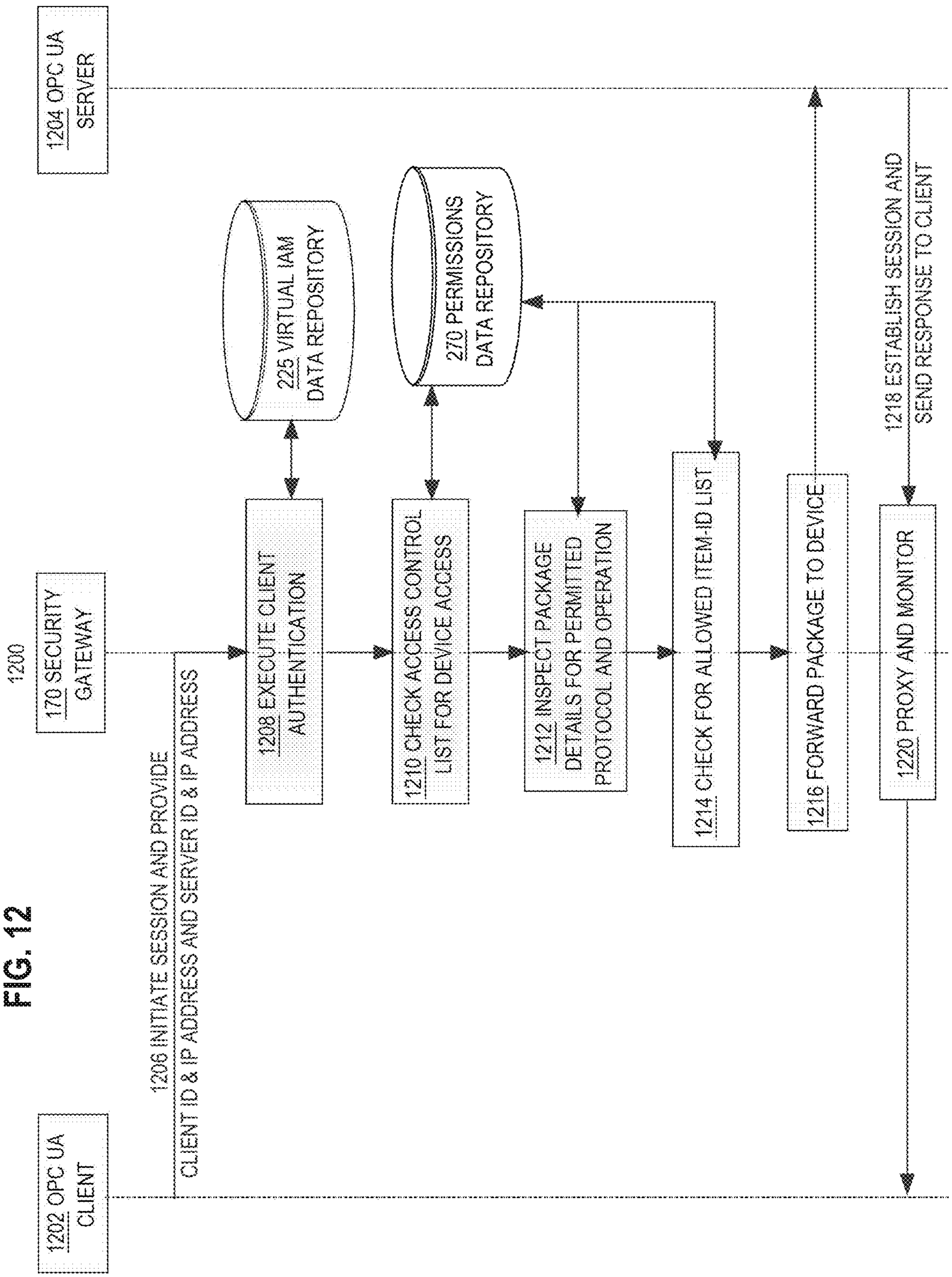
FIG. 12
1200
1202 OPC UA CLIENT
170 SECURITY GATEWAY
1204 OPC UA SERVER
1206 INITIATE SESSION AND PROVIDE CLIENT ID & IP ADDRESS AND SERVER ID & IP ADDRESS
1208 EXECUTE CLIENT AUTHENTICATION
225 VIRTUAL IAM DATA REPOSITORY
1210 CHECK ACCESS CONTROL LIST FOR DEVICE ACCESS
270 PERMISSIONS DATA REPOSITORY
1212 INSPECT PACKAGE DETAILS FOR PERMITTED PROTOCOL AND OPERATION
1214 CHECK FOR ALLOWED ITEM-ID LIST
1216 FORWARD PACKAGE TO DEVICE
1218 ESTABLISH SESSION AND SEND RESPONSE TO CLIENT
1220 PROXY AND MONITOR

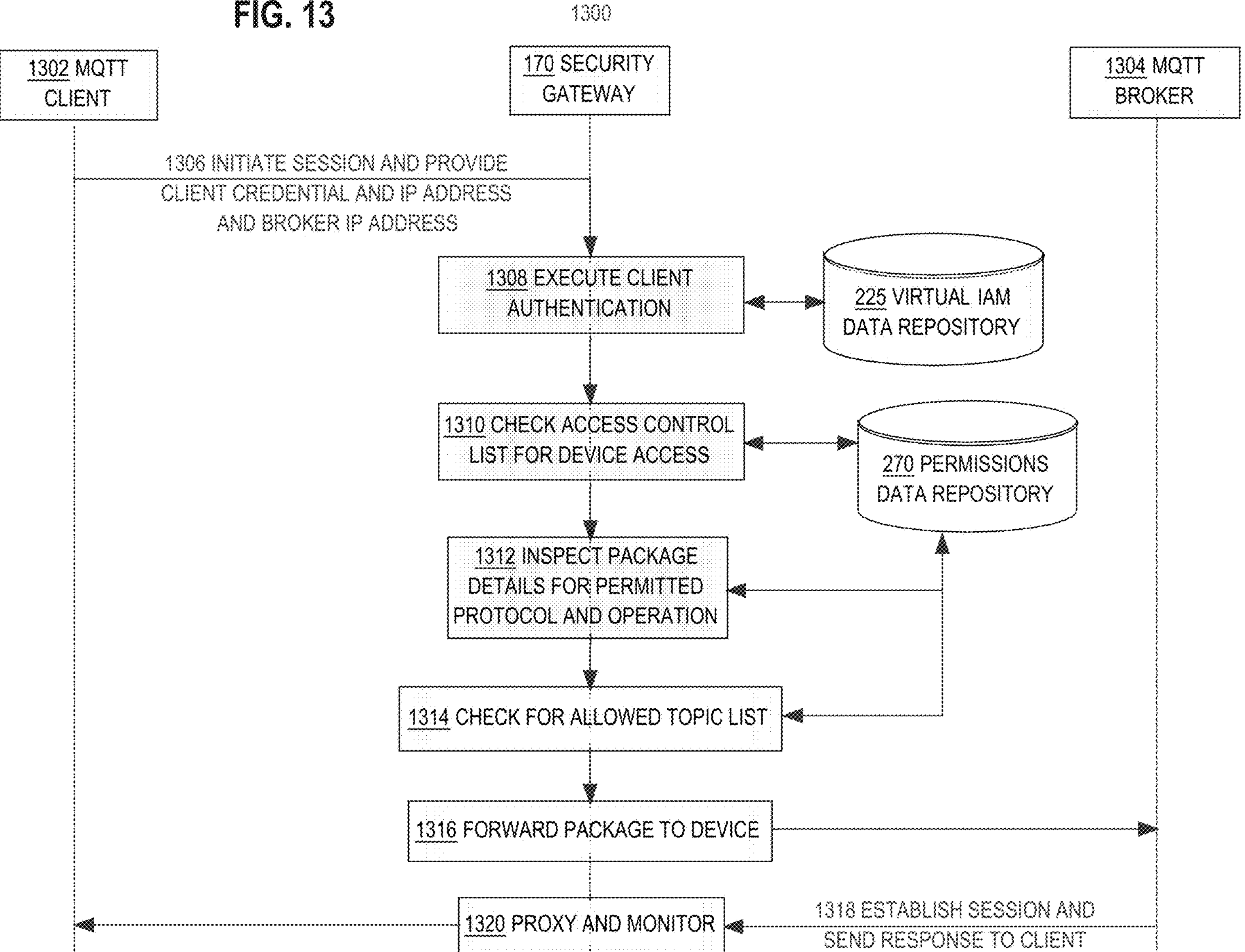
FIG. 13
1300
1302 MQTT CLIENT
170 SECURITY GATEWAY
1304 MQTT BROKER
1306 INITIATE SESSION AND PROVIDE CLIENT CREDENTIAL AND IP ADDRESS AND BROKER IP ADDRESS
1308 EXECUTE CLIENT AUTHENTICATION
225 VIRTUAL IAM DATA REPOSITORY
1310 CHECK ACCESS CONTROL LIST FOR DEVICE ACCESS
270 PERMISSIONS DATA REPOSITORY
1312 INSPECT PACKAGE DETAILS FOR PERMITTED PROTOCOL AND OPERATION
1314 CHECK FOR ALLOWED TOPIC LIST
1316 FORWARD PACKAGE TO DEVICE
1318 ESTABLISH SESSION AND SEND RESPONSE TO CLIENT
1320 PROXY AND MONITOR 1400
161 CLIENT DEVICE
1402 MODBUS CLIENT
161 CLIENT DEVICE
1410 MQTT SUBSCRIBER
161 CLIENT DEVICE
1416 OPC UA CLIENT
170 SECURITY GATEWAY
1406 MODBUS CLIENT
1404 MODBUS SERVER
1412 MQTT BROKER
1418 OPC UA SERVER
1420 OPC UA CLIENT
180 ENTERPRISE DEVICE
1408 MODBUS SERVER
180 ENTERPRISE DEVICE
1414 MQTT PUBLISHER
180 ENTERPRISE DEVICE
1422 OPC UA SERVER SERVER
1530
1528
INTERNET
ISP
1526
LOCAL NETWORK
1522
HOST
1524
NETWORK LINK
1520
1500
STORAGE DEVICE
1510
ROM
1508
MAIN MEMORY
1506
BUS
1502
COMMUNICATION INTERFACE
1518
PROCESSOR
1504
DISPLAY
1512
INPUT DEVICE
1514
CURSOR CONTROL
1516

SINGLE AUTHENTICATION PORTAL FOR DIVERSE INDUSTRIAL NETWORK PROTOCOLS ACROSS MULTIPLE OSI LAYERS

TECHNICAL FIELD

The technical field of the present disclosure relates to improved methods, systems, computer software, and/or computer hardware in the field of data security. The disclosure relates more specifically to improved computer-implement methods and systems for providing a single authentication portal that accommodates different network protocols across multiple Open System Interconnection (OSI) layers and that mitigates the security risks of hardcoded credentials. Certain embodiments are useful in collecting and processing data from internet of things (IoT) devices and improving the resistance of networked IoT devices to attacks, unauthorized or malicious use, or malware.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The development and deployment of internet of things (IoT) devices has proceeded with remarkable speed in the past several years. IoT devices are diverse, including everything from controllers of industrial equipment to smart watches and personal activity monitors. However, security infrastructure has not kept pace with the huge number and wide use of these devices. Some analysts estimate that billions of such devices will be operating and connected to internetworks within a few years, but there is presently no effective security architecture that can efficiently permit IoT devices to be secured, yet readily usable. Key constraints in this technical field have included limited processing power, limited memory, and limited or absent user interface elements. All these characteristics of IoT devices make them difficult to integrate into existing client-server security systems. At the same time, misuse of IoT devices could be catastrophic by permitting an attacker or unauthorized user to gain control of industrial equipment or other systems that have embedded IoT devices.

Traditionally, client computing devices with internet access can connect to enterprise server computers, which provide identity and access management (IAM) services for managing, validating, and controlling user access. Almost without exception, networks that permit access from desktop computers or mobile computing devices of end users have placed all principal security apparatus at the server computer. For example, a user who wants access to an online account can use a computer with internet connectivity to access a website with a login page and input identity information, such as a username and password. Once a server computer validates the identity information, policies control the amount of access any particular device has so that the user can access their own account without accessing any other data.

This traditional approach often uses hardcoded credential associated with the enterprise firmware. For example, some enterprise devices within an enterprise system are built with a default administrative account and password hard-coded into the enterprise device. This default account and password is publicly available and identical for each device of the same model and manufacture. Malicious attacks may target these devices and implement a hard reset, which would reset the device credential back to its factory setting. The malicious attacker would then have unfettered access to the enterprise device and all identity information associated with the enterprise device. Therefore, a security breach of an enterprise device on a system could compromise the security of the entire system if a malicious attack successfully accessed the identity information for all users and applications.

Furthermore, various IoT devices often use communication protocols that lack access regulation. For example, devices may use a Message Queue Telemetry Transport (MQTT) protocol to exchange messages about different topics. Based on the design of the MQTT protocol, any device with access to a MQTT message broker may have full access to all topics, which presents a security risk if some devices that should be properly denied access to particular topics are instead given access. Implementing an authentication system that accommodates the various protocols used by different devices presents yet another infrastructure challenge as a variety of different IoT devices become more widely-used. For example, while some devices use the MQTT protocol to communicate, other may use the Modbus protocol. Traditionally, the burden of accessing enterprise devices that use different protocols is placed on the client device such at the client device would need to be programmed to accommodate every protocol used by the various enterprise devices. This heavily strains the processing resources of the client device.

Thus, there is a need for a single authentication portal that can accommodate devices that use different network protocols across multiple OSI layers and mitigates the security risks of devices that use hardcoded credentials.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates a method for performing authentication services in an example embodiment.

FIG. 4 illustrates a method for providing transaction records and verification services in an example embodiment.

FIG. 5 illustrates a device access message flow with a security gateway as a HTTP WWW-Authenticate proxy, in an example embodiment.

FIG. 6 illustrates a device access message flow with a security gateway as an HTTP form-based authentication proxy, in an example embodiment.

FIG. 7 illustrates a device access message flow with a security gateway as an RTSP over HTTP proxy, in an example embodiment.

FIG. 8 illustrates a device access message flow with a security gateway as an SSH access token sever, in an example embodiment.

FIG. 9 illustrates a device access message flow with a security gateway as an SSH proxy, in an example embodiment.

FIG. 10 illustrates a device access message flow with a security gateway as an SSH proxy via an HTTP client, in an example embodiment.

FIG. 12 illustrates a device access message flow with a security gateway as an OPC UA proxy, in an example embodiment.

FIG. 13 illustrates a device access message flow with a security gateway as an MQTT proxy, in an example embodiment.

DETAILED DESCRIPTION

Figure 1:
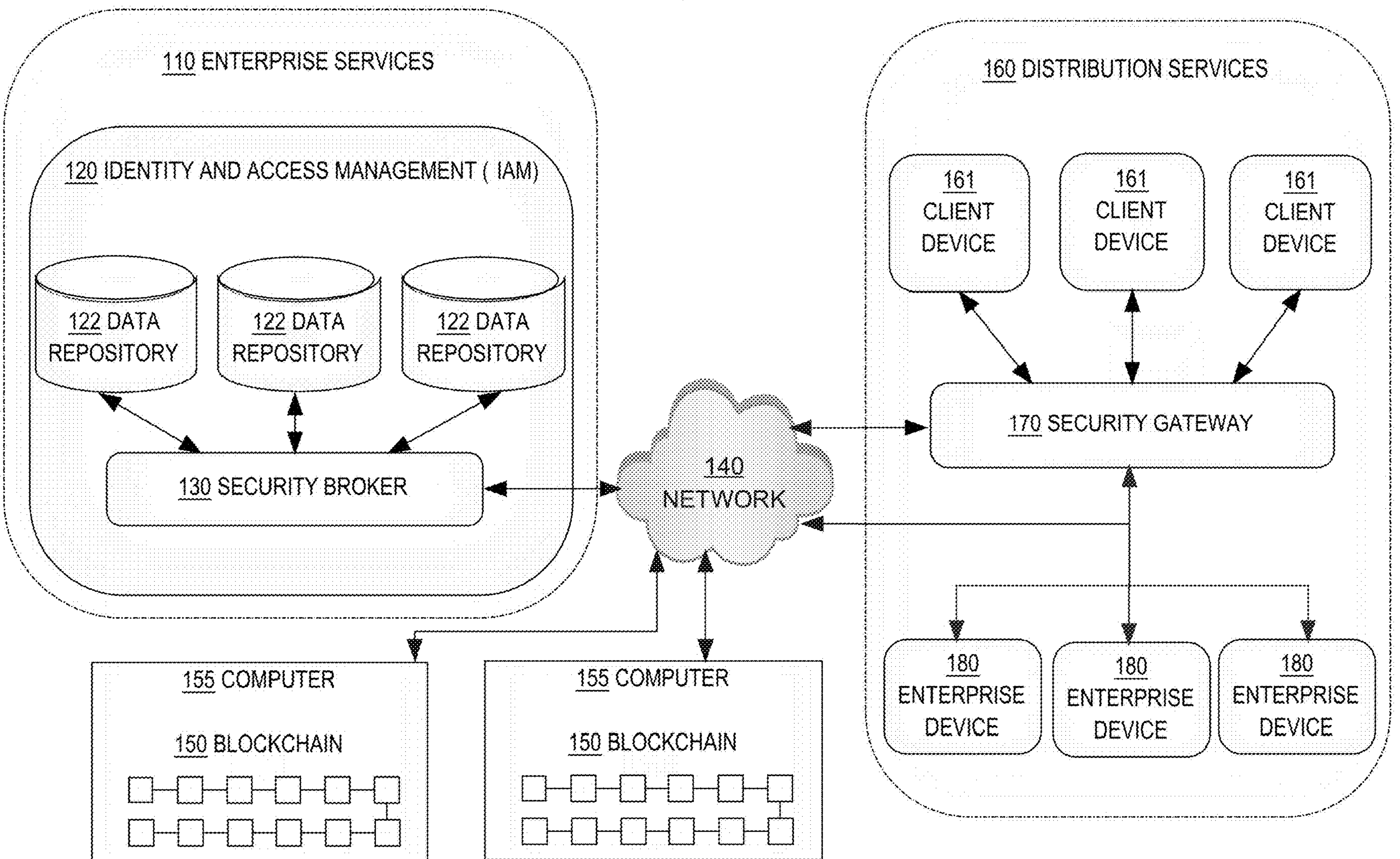
FIG. 1 illustrates a networked computer system in an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 General Overview
2.0 Structural Overview
  2.1 Enterprise Services
  2.2 Blockchain Architecture
  2.3 Distribution Services
3.0 Functional Overview
  3.1 Virtual IAM Services
  3.2 Enterprise Device Authentication Services
  3.3 Permissions Processing
  3.4 Audit Log and Validation
4.0 Procedural Overview
  4.1 Authentication Services
  4.2 Audit Log Generation and Validation
5.0 Device Access Message Flow Overview
  5.1 HTTP WWW-Authenticate Proxy
  5.2 HTTP Form Login Proxy
  5.3 RTSP Over HTTP Proxy
  5.4 SSH Access Token Server
  5.5 SSH Proxy
  5.6 SSH Proxy via HTTP Client
  5.7 Modbus Proxy
  5.8 OPC UA Proxy
  5.9 MQTT Proxy
  5.10 OT Protocol Converter and Aggregator
6.0 Hardware Overview

1.0 General Overview

According to various embodiments, methods and systems are provided that enable improved computer and network efficiency and security by providing local identity and access management (IAM) services to client devices on behalf of enterprise servers while authenticating to enterprise devices on behalf of the client devices. Past approaches required connection from the client devices to the enterprise server for authentication, after which the client devices would connect directly to enterprise devices. With these past approaches, if the security of any enterprise device were compromised, the enterprise server may still be authorizing client devices to access the compromised device. However, the present approach utilizes an intermediary to authenticate client devices on behalf of the enterprise server and to authenticate to enterprise devices on behalf of client devices. This approach provides ways of monitoring the status of all client and enterprise devices, detecting security breaches, and flagging suspicious activities. This approach has the benefit of decreasing the use of processing resources and network traffic for enterprise servers by moving identity and access management (IAM) services to the intermediary, decreasing the use of processing resources for client devices that are no longer responsible for enacting policies on themselves, and increasing resistance against malicious attacks on sensitive data using audit logs, data validation, and blockchains. Moreover, the present approach can be extended to a plurality of IoT devices that are geographically distributed and separate from the enterprise environment, without implementing resource-intensive security software on or at each IoT device.

In an embodiment, a computer-implemented method comprises receiving an authentication request from a first computing device. Subsequently, in response to receiving the authentication request from the first computing device, performing one or more authentication services on behalf of a second computing device using identity information that is stored in a first data repository. The computer-implemented method further comprises generating, based on data from an access control list maintained at the second computing device, a list of one or more third computing devices, receiving a request from the first computing device to access a third computing device in the list of one or more third computing devices, generating service identity information for authenticating to the third computing device and storing the service identity information in a second data repository, and performing one or more authentication services on behalf of the first computing device using the service identity information that is stored in the second data repository.

In an embodiment, a networked computer system comprises one or more processors and a computer-readable storage media coupled to the one or more processors. The networked computer system further comprises a memory coupled to the computer readable storage media storing instructions that cause the one or more processors to: receive an authentication request from a first computing device; in response to receiving the authentication request from the first computing device, perform one or more authentication services on behalf of a second computing device using identity information that is stored in a first data repository; generate, based on data from an access control list maintained at the second computing device, a list of one or more third computing devices; receive a request from the first computing device to access a third computing device in the list of one or more third computing devices; generate service identity information for authenticating to the third computing device and storing the service identity information in a second data repository; and perform one or more authentication services on behalf of the first computing device using the service identity information that is stored in the second data repository.

2.0 Structural Overview

FIG. 1 illustrates a networked computer system. In an embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

FIG. 1 illustrates only one of many possible arrangements of components configured to execute the programming described herein. Other arrangements may include fewer or different components, and the division of work between the components may vary depending on the arrangement. In the example of FIG. 1, a networked computer system 100 may facilitate the secure exchange of data between programmed computing devices providing enterprise services 110, devices providing distribution services 160, and devices of a blockchain 150. Therefore, each of elements 110, 155, 160 of FIG. 1 may represent one or more computers that host or execute stored programs that provide the functions and operations that are described further herein in connection with enterprise services, distribution services and blockchain operations. The methods and systems describe herein may be designed to accommodate a variety of different enterprises. Each enterprise may have its own security broker 130, blockchain 150, and/or security gateway 170 with settings that are customized to the preferences of each enterprise.

2.1 Enterprise Services

Enterprise services 110 may be services that are programmatically offered by an enterprise, including identity and access management (IAM) 120 services. Typically, such services are delivered by executing control programs or application programs on computers and processing and responding to requests of client computing devices using client-server digital message communications over networks based on defined protocols. IAM 120 services may enable devices, such as enterprise servers, to manage, validate, and control device and user access for any of a plurality of geographically distributed computing devices, including but not limited to IoT devices.

Enterprise servers and other enterprise computing devices are often heavily protected to ensure data security and prevent malware breaches. Traditionally, when a device requests access from an enterprise server, the enterprise server may go through a validation process that is managed using programs executed in cooperation by the enterprise server and device. The validation process may include authentication, authorization, and accounting of users, applications, and/or devices. Access control policies defined by the enterprise server may determine which users, applications, and/or devices will have access to what types of data. Instead of this traditional approach, one embodiment of the current approach implements a validation process not at the enterprise server but using a security gateway 170, as further described herein, with significant technical benefits and improvements over past practice.

In an embodiment, the access control policies may be stored in a data repository 122 associated with the enterprise server and updated according to enterprise needs. Consequently, a central control point associated with an enterprise can maintain control of security policy, while IAM 120 services or other functions are executed closer to protected IoT devices, for example. Identity information associated with users, applications, and/or devices may also be stored in data repository 122. Identity information may include, for example, usernames, passwords, and their corresponding access control policies.

Security broker 130 may be a computer, software and/or hardware or a combination storing instructions that are programmed or configured to access identity information stored in the data repository 122 and detect changes to the identity information. The security broker 130 may copy the identity information locally in a cache, hash and encrypt the identity information, and send the information over a network 140 to a blockchain 150.

Network 140 broadly represents a combination of one or more local area networks, wide area networks, global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 140 and the disclosure presumes that all elements of FIG. 1 are communicatively coupled via network 140.

While each of the components listed above is illustrated as if located on a single computer, one or more of the components listed above may be part of and/or executed on different computers. For example, data repository 122 may be may be located on the same or a separate computer from another data repository 122. As another example, data repository 122 may be storage drives coupled to an enterprise server.

2.2 Blockchain Architecture

The blockchain 150 may comprise blocks of linked data that are stored in an interconnected network of computers, with suitable stored programs at those computers to support ordered creation and transmission of blockchain data. Blockchain 150 forms a distributed database that maintains a continuously growing list of ordered records termed blocks that are timestamped and linked to a previous block. Each block in the series of blocks is linked together chronologically, with each new block containing a hash of the previous block. Each computer 155, or node, in a network of computers may store the entire record of linked data blocks. This creates a consensus network of computers that can verify the integrity of each block of data and the integrity of the entire blockchain 150. The consensus network has the benefit of having a high Byzantine fault tolerance, which is the ability of a computing system to tolerate Byzantine failures. As a result, the blockchain 150 functions as a distributed database that ensures the integrity of the data by utilizing hash functions to link each block to its previous block and storing the entire record of data blocks at each node.

2.3 Distribution Services

Distribution services 160 may be computer-implemented services that are configured or programmed for distributing IAM services locally to a client device 161 and authenticating to an enterprise device 180. A client device 161 may be a computer, a virtual computer, and/or a computing device. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. The enterprise device 180 may be computer network devices such as gateways, modems, routers, wireless access points, switches, hubs, and firewalls. The client device 161 may also be other IoT devices, which are physical devices with network connectivity capabilities that enables these physical devices to collect and exchange data. The client device 161 may also be specific users using a computer or IoT device. The client device 161 may also be applications running on a computer or IoT device.

Security gateway 170 may be a computer, software and/or hardware or a combination storing instructions configured to perform virtual IAM services locally with or without uninterrupted internet access. The security gateway 170 may access identity information stored in the blockchain 150, detect changes to blockchain 150 data and update a local data repository with the updated access identity information, as further described herein. Client device 161 may connect to the security gateway 170 so that the security gateway 170 may perform virtual IAM services for client device 161 locally using the identity information stored in a data repository associated with the security gateway 170. Performing virtual IAM services for client device 161 may occur with or without access to the network 140. The security gateway 170 may also store client device information in a separate data repository and periodically update the blockchain 150 with the stored information. In one embodiment, the security gateway 170 may be a separate device or program from the enterprise device 180, or it may be programmed to run inside the enterprise device 180 given adequate computing resources.

Enterprise device 180 may be a computer, a virtual computer, and/or a computing device. A computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. The enterprise device 180 may be computer network devices such as gateways, modems, routers, wireless access points, switches, hubs, and firewalls. The enterprise device 180 may also be other IoT devices, which are physical devices with network connectivity capabilities that enables these physical devices to collect and exchange data. The enterprise device 180 may also be specific users using a computer or IoT device. The enterprise device 180 may also be applications running on a computer or IoT device.

3.0 Functional Overview

It will be apparent that the security gateway 170 represents a converged set of different technology foundations that have been combined in a new way. In an embodiment, the security gateway 170 provides an intermediary between the client device 161 and the enterprise device 180. One purpose of the security gateway 170 is to provide local, virtual IAM services without the need for client device 161 to connect to the internet and access enterprise servers that would otherwise perform these IAM 120 services. Another purpose of the security gateway 170 is to authenticate to an enterprise device 180 on behalf of the client device 161. The security gateway 170 also functions to associate user accounts with permission levels for each enterprise device 180 and track transactions between the client device 161 and enterprise 180 for auditing and validation purposes. Thus, the security gateway 170 functions as a single portal for authenticating, regulating, and tracking client device 161 access to the enterprise device 180, and for detecting potential security breaches of the enterprise device 180, as further described in other sections herein.

3.1 Virtual IAM Services

Figure 2:
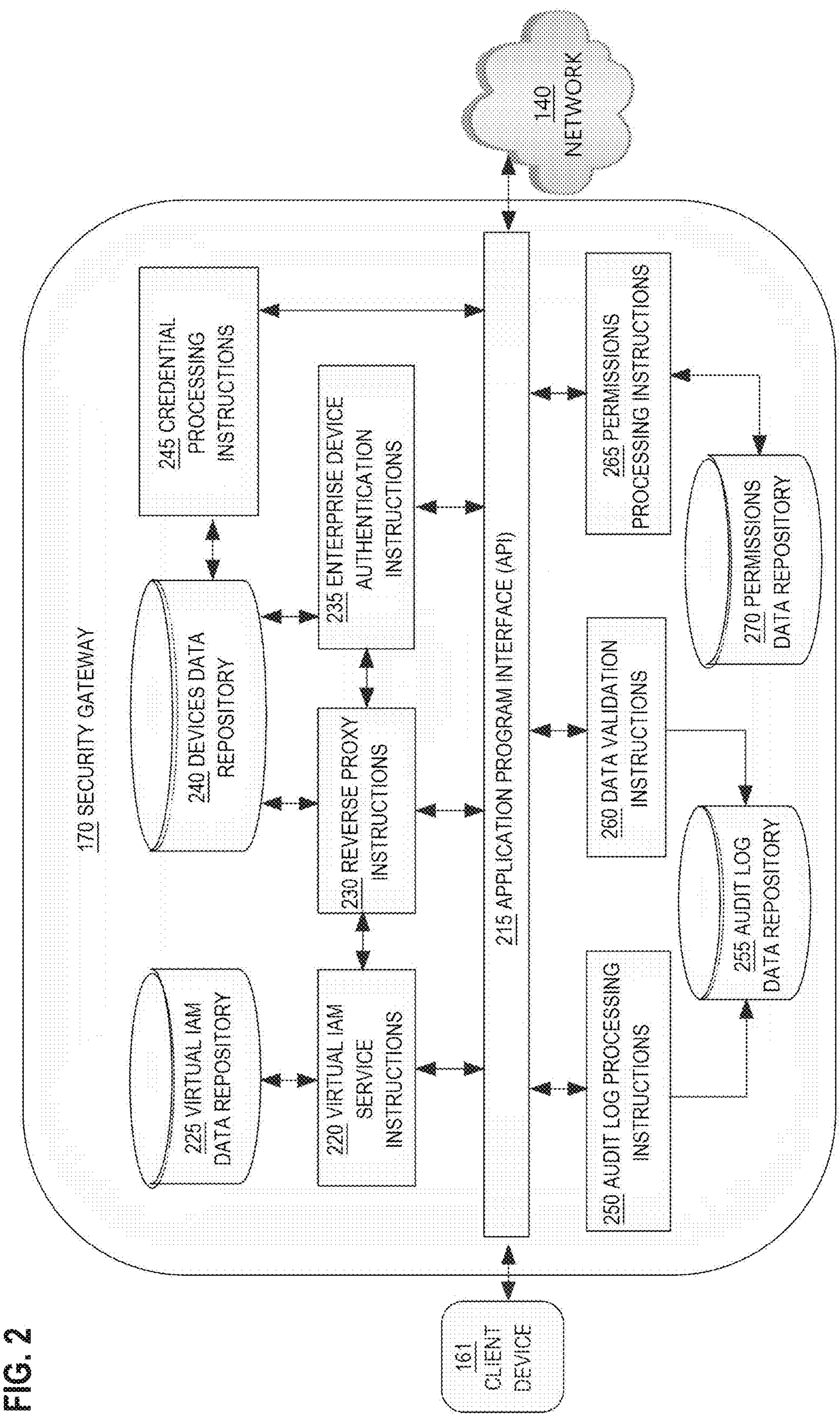
FIG. 2 illustrates a security gateway in an example embodiment.

FIG. 2 illustrates a security gateway in an example embodiment. Security gateway 170 may be a computer, software and/or hardware or a combination storing instructions and/or databases that detect, store, and utilize identity information for local authentication services with or without internet access. Specifically, the security gateway 170 may comprise programmed instructions that implement an Application Program Interface (API) 215 that defines program functions that a client device 161 may call to connect to the security gateway 170. The API 215 may be, for example, a representational state transfer (REST) API integrated with an HTTP server so that RESTful API calls can be issued in parameterized URLs over HTTP from the client device 161 to the API 215. In one embodiment, a client device 161 connected to the gateway through the API 215 may be validated using the virtual IAM service instructions 220. The virtual IAM service instructions 220 may perform virtual IAM services for connected client device 161 locally using the identity information stored in the virtual IAM data repository 225.

Performing virtual IAM services for client device 161 may occur with or without access to the network 140. For example, while the security gateway 170 is offline, the virtual IAM service instructions 220 may, despite the lack of internet access, parse the virtual IAM data repository 225 for identity information and use the identity information to authenticate client device 161. A technical benefit of this approach is that validation services may occur without the constant need for internet connectivity. Instead, validation services may be provided locally through an intranet or other local networking facility.

Once client device 161 is authenticated, the API 215 may present a list of each enterprise device 180 that an authenticated client device 161 is authorized to access based on an access control list maintained at the enterprise server. The access control list may also be stored as a mapped permissions list at the security gateway 170, as further describe herein. A user may then select a particular enterprise device 180 to access.

3.2 Enterprise Device Authentication Services

Certain enterprise devices may require local authentication in order to grant access. For example, small wind turbines may have factory default credentials hard-coded in flash memory or other non-volatile storage. To access the turbine, the factory default credentials are entered and then subsequently changed to custom credentials for security purposes. Thereafter, the custom credentials must be provided in order to access the turbine. In an embodiment, the security gateway 170 may act in place of the client device 161 in setting up credentials, storing those credentials for local authentication with the enterprise device 180, and rotating the credentials for increased security.

In one embodiment, credential processing instructions 245 may be programmed to generate credentials for accessing the enterprise device 180 on behalf of the client device 161. The credentials may be, for example, a service account and password for the security gateway 170. Once credentials are generated, they may be stored in a devices data repository 240. The enterprise device authentication instructions 235 may use the credentials stored in the devices data repository 240 to authenticate to the enterprise device 180. The credential processing instructions 245 may also rotate credentials for each enterprise device 180 to increase security. Specifically, rotating credentials involves performing a series of steps to generate new credentials and delete old ones so that, in the event of an undetected security breach, the credentials will only be available to the malicious attacker for a limited period of time before they are changed. The frequency of rotation may be customizable and based on days, weeks, months, years or any other incremental period of time. Further details are provided herein in other sections.

In an embodiment, a user of an authenticated client device 161 has selected a particular enterprise device 180 to access, then in response, the security gateway 170 is programmed to use enterprise device authentication instructions 235 in association with the reverse proxy instructions 230 to authenticate to the enterprise device 180 on behalf of the client device 161. The enterprise device authentication instructions 235 may be programmed to use the credentials stored in the devices data repository 240 in association with the particular enterprise device 180 to authenticate to the enterprise device 180 while the reverse proxy instructions 230 proxies the request. The reverse proxy instructions 230 may be programmed to use a dynamic configuration so that there is no down time for adding a new enterprise device 180 or changing the credentials.

In an embodiment, if the security gateway 170 properly authenticates to the enterprise device 180, then client device 161 may access the enterprise device 180 under program control. However, if the security gateway 170 does not properly authenticate to the enterprise device 180, then the security gateway may be programmed to mark the enterprise device as compromised, such that the security gateway will no longer accept or pull data from the enterprise device, as further described herein.

3.3 Permissions Processing

Access to various IoT devices may be regulated through the use of different permission levels, such as root, administrative, read-write, and read-only levels. The security gateway 170 may be configured to regulate an authenticated user or authenticated device's access to a particular IoT device based on predetermined permission levels associated with roles or permissions such as "admin" or "user". For example, a client device 161 may connect to the security gateway 170, which provides virtual IAM services on behalf of the enterprise server. A user account may be associated with the client device 161.

Once the client device 161 has been validated using the user account, security gateway 170 may be programmed to limit the ability of the client device 161 to access an enterprise device 180 based on the access control list maintained at enterprise servers. The permissions processing instructions 265 may be programmed to retrieve the access control lists maintained at the enterprise servers and generate a local permissions list. The local permissions list may be, for example, a Role Based Access Control (RBAC) list that maps each user account associated with any client device 161 to a particular role or permission for every enterprise device 180 to which the user account is granted access. In an example embodiment, the RBAC list may also map groups of user accounts to roles for one enterprise device 180 or a group or groups of enterprise devices.

In an example embodiment, a first user account associated with a first client device 161 may be designated an "admin" in the access control lists for each of three different enterprise devices, and therefore, given administrative privileges to the first enterprise device 180, the second enterprise device 180, and the third enterprise device 180. A second user account associated with a second client device 161 may be designated a "user" in the access control list for each of the three different enterprise device, and therefore, given read-write privileges to the first enterprise device 180, the second enterprise device 180, and the third enterprise device 180. A third user account associated with a third client device may be designated an "admin" for the first enterprise device 180 and the second enterprise device 180 based on the access control lists for each of those devices, but may also be designated a "user" for the third enterprise device 180. In this case, the permissions processing instructions 265 are programmed to retrieve each access control list associated with each of the enterprise devices. The permissions processing instructions 265 may be programmed to generate a local permissions list that maps the third user account to administrative privileges for the first enterprise device 180 and the second enterprise device 180, but limited user access to the third enterprise device 180. This local permissions list may be stored in a permissions data repository 270.

3.4 Audit Log and Validation

Since the security gateway 170 may be programmed to act as an intermediary between the client device 161 and the enterprise device 180, it is logically positioned to track packets, segments, flows or other communications for all transactions to and from all IoT devices. The audit log processing instructions 250 may be programmed to record, for example, a timestamp, an actor, an operation/transaction, a severity, and a status of any activities processed by the security gateway 170 and generate an audit log for tracking and security purposes. An audit log may be an individual transaction entry or it may be a series of transaction entries presented in cleartext.

The audit log processing instructions 250 may generate single audit log entry as each transaction occurs or it may generate audit logs comprising multiple entries at certain periods of time. The types of data recorded and featured in the audit log, as well as the frequency at which audit logs are generated may be specified in configuration data or programmed. The specific types of actors, operations/transactions, severity, and statuses are also customizable. The following is an example of an audit log that may be generated:

| Timestamp | Actor | Operation/ Transaction | Severity | Status |
|---|---|---|---|---|
| T1 | User: John Smith | Login attempt | Info | Successful |
| T2 | Device: Temp Sensor 1 | Posting data | Info | Approved |
| T3 | Device: IP Camera 1 | Login attempt | Alert | Fail attempts—5 times |
| T4 | Device: IP Camera 2 | Data Stream | Alert | Outage |

In the example above, the audit log features four (4) entries. The Timestamp column features T1 through T4, which represent different times during which a transaction was recorded. The time may be recorded by the hour, minute, and/or second. In addition to the Timestamp, the audit log may be configured to record additional information, such as the date. The Actor column features each actor that initiated an event or activity. An actor may be any IoT device, such as a client device 161 or an enterprise device 180, and may be recorded as the name of a user, an account associated with a user, the name of a device, an account associated with a device, an Internet Protocol (IP) address, a Media Access Control (MAC) address, or any other form of identification. The Operation/Transaction column features operations, transactions, events, inputs, and/or activities conducted by the actor, such as a login attempt, posting data, or streaming data.

The specific types of activities that are recorded may be customized based on the functionality of the enterprise device 180 and what the actor does. For example, if a client device 161 accesses a particular enterprise device 180 that records sensor data in order to download the data, the activity recorded by the audit log may be "downloading data."

The Status column features a status of each Operation/Transaction, such as indicating whether a login was successful and whether the posting of certain data was approved. The Severity column features an indicator for each Operation/Transaction, such as an alert for flagging unusual activities. The alerts can be customized to track activities that may indicate a potential security risk. In the example above, an alert is recorded and sent for five failed login attempts to IP Camera 1.

The audit log processing instructions 250 may be programmed to record and send an alert after any number of failed login attempts, such as six, four, or three. Since the security gateway 170 has attempted and failed to authenticate to IP Camera 1 five times, IP Camera 1 may have been compromised by a malicious attack. As a result, the audit log processing instructions 250 has recorded the event in the audit log and generated an alert. The alert may cause the security gateway 170 stop accepting or pulling data from IP Camera 1.

An audit log generated by the audit log processing instructions 250 may be stored in the audit log data repository 255. In one embodiment, the audit log data repository 255 may be located at the security gateway 170 and managed by a third party on behalf of the enterprise. In another embodiment, the audit log data repository 255 may be located outside the security gateway 170 and managed by the enterprise. Any combination of audit log data repository 255 locations and management may be used.

Upon delivery to the audit log data repository 255, the audit log processing instructions 250 may calculate a hash, or hash value, of the audit log. For example, a hash function, such as an MD5 or any other cryptographic hash function, may map each audit log to a hash, or index, such as an MD5 hash. The hash may act as a numerical representation of each audit log. Any hash function, as understood in the art, may be used. The hash may then be recorded to the blockchain 150.

The blockchain 150 functions as a decentralized digital ledger that tracks numerous entries. Copies of the entire blockchain may be stored at each computer 155, or node, in a distributed network of interconnected computers of which FIG. 1 illustrates computer 155 with blockchain 150. In an embodiment, proposed entries to the blockchain 150 may be checked by a majority of the computers for verification. For example, if a new entry is generated for storage in the blockchain 150, the network of interconnected computers that also store copies of the blockchain 150 would first run algorithms to evaluate the hash value and verify the validity of the entry. If a majority of the computers agree that the entry is valid, then the entry will be added as a new block in the blockchain 150. As a part of a consensus network, blockchain 150 enforces high Byzantine fault tolerance; for example, a malicious attack attempting to alter the information in the blockchain 150 would need to control over 50% of the computers in the consensus network to alter the consensus. Since it would be exceedingly difficult to maliciously attack and maintain control over that many computers, the blockchain 150 data is better protected against malicious attacks than traditional methods of data storage.

The security gateway 170 may also have data validation instructions 260 as an added security measure, which validate the integrity of the audit logs. In one embodiment, the data validation instructions 260 may apply the same previously used hash function to the audit logs stored in the audit log data repository 255 and compare that hash with the hash of the audit log stored in the blockchain 150. Any changes to the audit log stored in the audit log data repository 255 would change the hash, thereby creating differences in the hash from the audit log data repository 255 compared to the hash from the blockchain 150. If the current hash matches the hash stored in the blockchain 150, then no changes have been made. However, if the current hash does not match the hash stored in the blockchain 150, then changes to the audit logs have been made. Thus, the data validation instructions 260 provides increased security by validating that the audit logs have not been tampered with.

4.0 Procedural Overview

FIG. 3 and FIG. 4 illustrate algorithms or methods for performing authentication services and for providing transaction records and verification services, in example embodiments. FIG. 3 and FIG. 4 may be used as a basis to code one or more computer programs or other software elements that the security gateway 170 executes or hosts. In an embodiment, using the approaches of this section, security gateway 170 offers virtual IAM services in place of enterprise servers that would otherwise need to provide authentication services to client devices. The security gateway 170 also acts in place of client devices by authenticating to enterprise devices on behalf of the client device 161. The security gateway 170 also tracks all transactions to and from each IoT device and stores those transactions in an audit log that may warn of potentially compromised devices.

4.1 Authentication Services

FIG. 3 illustrates a method for performing authentication services in an example embodiment.

A method 300 starts at step 310, in which an authentication request from a first computing device is received. The first computing device may be, for example, a client device 161 that is requesting to be authenticated so that the client device 161 may access the security gateway 170.

At step 320, in response to receiving the authentication request from the first computing device, the security gateway 170 is programmed to perform one or more authentication services on behalf of a second computing device using identity information that is stored in a first data repository. The second computing device may be, for example, an enterprise server that would otherwise be offering IAM 120 services. The security gateway 170 uses virtual IAM service instructions 220 to authenticate using the information stored in the virtual IAM data repository 225 on behalf of the enterprise server. This decreases network traffic and the use of processing resources at the enterprise server, which no longer performs the IAM 120 services directly.

At step 330, the security gateway 170 generates a list of one or more third computing devices based on data from an access control list maintained at the second computing device. Each of the one or more third computing devices may be, for example, an enterprise device 180. While the access control lists are maintained at the enterprise servers, the security gateway 170 may use the permissions processing instructions 265 to retrieve the access control lists and generate a local permissions list. The local permissions list may map each user account associated with any client device 161 to a particular permission for every enterprise device 180 the user account is granted access to. The local permissions list may be stored at the permissions data repository 270 and used at step 330 to generate the list of each enterprise device 180 that the user account may access. For example, after a client device 161 is authenticated by the security gateway 170, the security gateway 170 may send, to the authenticated client device 161, a list of each enterprise device 180 it may access. In one embodiment, the list may be displayed on the client device 161 display screen as options for the user to select.

At step 340, the user may use client device 161 to select which enterprise device 180 to access, which the security gateway 170 receives as a request. Once a user has selected which enterprise device 180 to access, the security gateway 170 will use the reverse proxy instructions 230 to proxy the request from the client device 161.

At step 350, the security gateway 170 generates service identity information for authenticating to the third computing device and stores the services identity information in a second data repository. Generating and storing service identity information to access the enterprise device 180 may be done during an enterprise device's initial set-up with the security gateway 170, for example. Specifically, the credential processing instructions 245 may generate credentials for accessing the enterprise device 180 on behalf of the client device 161. The credentials may be, for example, a security gateway 170 service account and password. The credential processing instructions 245 may also generate and send requests to the enterprise device 180 for updating the credentials stored on the enterprise device 180 so that the enterprise device 180 may recognize and authenticate the security gateway 170 using the updated credentials. Once the credentials are generated, they may be stored in a devices data repository 240 for subsequent use by the enterprise device authentication instructions 235 to authenticate to the enterprise device 180. The credential processing instructions 245 may also rotate credentials for each enterprise device 180 to increase security. Rotating credential involves using the credential processing instructions 245 to first generate new credentials for local authentication purposes and save the new credentials in the devices data repository 240. Once the new credentials are generated, the credential processing instructions 245 may send a request to the enterprise device 180 to reset the credentials and use the new credentials. The old credentials are then deactivated and the new credentials tested to confirm that the security gateway 170 can properly authenticate to the enterprise device 180 using the new credentials. If the security gateway 170 is capable of properly authenticating using the new credentials, then the deactivated old credentials are deleted. If the security gateway 170 is not capable of properly authenticating using the new credentials, then the process is repeated. The frequency of rotation may be customizable and based on days, weeks, months, years or any other incremental period of time.

At step 360, the security gateway 170 uses the reverse proxy instructions 230 and the enterprise device authentication instructions 235 to authenticate to the enterprise device 180 on behalf of the client device 161 while proxying the client device 161 request. Specifically, the reverse proxy instructions 230 may wait to receive a request from the authenticated client device 161 to access a particular enterprise device 180. Once the request is received, the enterprise device authentication instructions 235 may use the credentials stored in the devices data repository 240 in association with the particular enterprise device 180 to authenticate to the enterprise device 180 while the reverse proxy instructions 230 proxies the request.

If the security gateway 170 properly authenticates to the enterprise device 180, then client device 161 may access the enterprise device 180. If the security gateway 170 does not properly authenticate to the enterprise device 180, then the enterprise device 180 may be marked as compromised such that the security gateway 170 will no longer accept or pull data from the enterprise device 180. For example, a wind turbine that has factory default credentials hard-coded into the firmware may be compromised by malicious attacks and reset to its original factory default settings. The enterprise device authentication instructions 235 of the security gateway 170 would not be able to authenticate to the turbine because the factory default credentials would not match the credentials stored in the devices data repository 240. As a result, the security gateway 170 would mark the turbine as compromised by using the audit log processing instructions 250 to record an alert. Any alert featured in an audit log may be used to direct the reverse proxy instructions 230 not to proxy any requests from the client device 161 to the compromised enterprise device 180. Any communication data from the compromised enterprise device 180 will also not be accepted by the security gateway 170.

4.2 Audit Log Generation and Validation

FIG. 4 illustrates a method for providing transaction records and verification services in an example embodiment. The method 400 may start at step 410, where the security gateway 170 may generate and store, in a third data repository, a transaction record that identifies a timestamp, an actor, a transaction, a severity, and a status based, at least in part, on the authentication request, the one or more authentication services performed on behalf of the second computing device, or the one or more authentication services performed on behalf of the first computing device. The transaction record may be, for example, an audit log generated by the audit log processing instructions 250. Since the security gateway 170 acts as an intermediary between the client device 161 and the enterprise device 180, the security gateway 170 may monitor all devices and all transactions mediated by security gateway 170.

Specifically, the audit log processing instructions 250 may acquire data from and about every device that the security gateway 170 has received authentication requests from, authenticated via the virtual IAM service instructions 220, or has authenticated to via the enterprise device authentication instruction 235 and reverse proxy instructions 320. The data may include information such as, for example, a timestamp, an actor, a transaction, a severity, and/or a status. The audit log processing instructions 250 may acquire the data using a network protocol, a Simple Network Management Protocol (SNMP), or any other applicable protocol for monitoring traffic.

The audit log processing instructions 250 may also be programmed and configured to monitor any reactionary input received at the security gateway 170 and interpret the input into an audit log. Once the data has been acquired, the audit log processing instructions 250 may generate an audit log with a single or multiple entries in cleartext that log the data. The audit log may be used to track transaction histories, monitor potential problems, and provide a secure and verifiable source of transaction information.

Audit log processing instructions 250 may, at step 420, digitally generate a cryptographic hash value over the audit log upon delivery to the audit log data repository 255. For example, a hash function, such as an MD5 or any other cryptographic hash function, may map each audit log to a hash, or index, such as an MD5 hash. The hash may act as a numerical representation of each audit log. Any hash function, as understood in the art, may be used. At step 430, the audit log and a first copy of the hash value may be stored in association with one another in the audit log data repository 255. Subsequently, at step 440, the audit log and a second copy of the hash value may be stored in association with one another as data values in the blockchain 150.

By storing the audit log and the hash value in the blockchain 150, the integrity of the audit log may be verified using the data validation instructions 260. For example, at step 450, the data validation instructions 260 may compare the first copy of the hash value stored in the audit log data repository 255 with the second copy of the hash value stored in the blockchain 150 and evaluate whether the hash values match. If the first copy of the hash value is the same as the second copy of the hash value, then the integrity of the audit logs has not been compromised. However, if the two copies of the hash values are different, then the data validation instructions 260 may generate an alert indicating that the data in the audit logs may have been compromised.

5.0 Device Access Message Flow Overview

To support method 300 and method 400 over a variety of different platforms, the security gateway 170 needs to be able to authenticate regardless of inherent communication differences between different client devices and enterprise devices. Therefore, the security gateway 170 may be programmed to accommodate a wide variety of different communication protocols, such as, for example, HTTP, Real Time Streaming Protocol (RTSP) over HTTP, Secure Socket Shell (SSH), Telnet, Operational Technology (OT) protocols such as MQTT, Modbus, and Object linking and embedding for Process Control Unified Architecture (OPC UA), or any other applicable protocol. Thus, the security gateway provides a single authentication portal that can accommodate and translate different network protocols across various client interfaces. Example embodiments of device access message flows using these various protocols are further provided herein.

5.1 HTTP WWW-Authenticate Proxy

FIG. 5 illustrates a device access message flow 500 with the security gateway 170 programmed as a HTTP WWW-Authenticate proxy. At step 506, a user may use a client device 161 to request the security gateway Uniform Resource Identifier (URI) using an HTTP client 502, such as a web browser, over a Secure Sockets Layer (SSL) to create an HTTP Secure (HTTPS) connection. A login page to access the security gateway 170 is displayed so the user may enter the enterprise credentials, such as a username and password. Depending on how the security gateway 170 is configured, multi-factor authentication may optionally be used such that users will be asked for additional security information. At step 508, the security gateway 170 may authenticate using authentication information stored in the virtual IAM data repository 225.

After the security gateway 170 authenticates the user, the security gateway may use the Role Based Access Control (RBAC) list stored in the permissions data repository 270 to generate a list of enterprise devices the authenticated user is authorized to access and present this list to the user at step 510. Once the user selects an enterprise device 180 from the list of accessible devices at step 512, and the selection is sent in step 514, the security gateway 170 may, at step 516, map the enterprise device to a network IP address stored in the devices data repository 240. The IP address may identify a device HTTP server 504, which is associated with the user-selected enterprise device 180. The devices data repository 240 may store, for example, a list of devices, IP addresses, URI's, automatic login information, and other relevant information related to the IoT devices.

At step 518, the security gateway 170 may then send an HTTP request to the device HTTP server 504 requesting the homepage. At step 520, the device HTTP server 504 may respond to the request with a 401 status code, or authentication challenge. Subsequently, at steps 522 and 524, the security gateway 170 may use the enterprise device authentication instructions 235 to generate a proper WWW-Authenticate authorization response header, and send the header along with the correct credentials. If there are multiple accounts on the enterprise device 180, the applicable user account will be chosen based on the privileges defined in the RBAC list. Once the device HTTP server 504 receives the correct header and credentials, it may establish an authentication session with the HTTP client 502 at steps 526 and 530. Cookies and other headers from the client device 161 may be forwarded to the enterprise device 180, making the security gateway 170 a transparent proxy. All activities that occur during the authentication session may be monitored and logged by the security gateway 170 at step 528, using the audit log processing instructions 250, for audit purposes. The authentication tokens and other session states are maintained between the client device 161 and the enterprise device 180 to better enable functionality of the web application.

5.2 HTTP Form Login Proxy

FIG. 6 illustrates a device access message flow 600 with the security gateway 170 programmed as an HTTP form-based authentication proxy. This device access message flow 600 is similar to the device access message flow 500 except that after an authentication request is sent from the security gateway 170 to a device HTTP server 604, the device HTTP server 604 responds with a UI for form-based authentication.

At step 602, a user may use a client device 161 to request the security gateway URI using an HTTP client 502, such as a web browser, over an SSL to create an HTTPS connection. A login page to access the security gateway 170 is displayed so the user may enter the enterprise credentials, such as a username and password. Depending on how the security gateway 170 is configured, multi-factor authentication may optionally be used such that users will be asked for additional security information. At step 604, the security gateway 170 may authenticate the user using the authentication information stored in the virtual IAM data repository 225.

After the security gateway 170 authenticates the user, the security gateway may use an RBAC list stored in the permissions data repository 270 to generate a list of enterprise devices that the authenticated user is authorized to access and present this list to the user at step 606. Once the user selects an enterprise device 180 from the list of accessible devices at step 608, and the selection is sent in step 610, the security gateway 170 may, at step 612, map the selected enterprise device to a network IP address stored in the devices data repository 240. The IP address may identify a device HTTP server 504 associated with the selected enterprise device 180. The devices data repository 240 may store, for example, a list of devices, IP addresses, URI's, automatic login information, and other relevant information related to the IoT devices.

At step 614, the security gateway 170 may then send an HTTP request to the device HTTP server 504 requesting the homepage. At step 616, the device HTTP server 504 may respond to the request with a 401 status code, or authentication challenge, containing Hypertext Markup Language (HTML), JavaScript, and Cascading Style Sheets (CSS) code for form-based authentication. Upon receipt of the HTML, JavaScript, and CSS code associated with the authentication challenge, the security gateway 170 may generate a JavaScript snippet using the enterprise device authentication instructions 235. To generate the JavaScript snippet, the security gateway 170 may use pre-configured form elements, such as a login text field ID, a password field ID, and a submit button ID. The security gateway 170 may also automatically include the correct username and generate a masked password to automatically include in the JavaScript snippet. The masked password make be used to hide or encrypt the original password for security purposes. For example, the security gateway 170 may generate a random string that has the same length as the original password to act as the masked password. In addition to the length of the original password, the security gateway 170 may take other password criteria into consideration when generating the masked password so that the field validation will not generate errors and block the form submission. The original password may be mapped to the masked password and stored in a cache. For flexibility, additional JavaScript snippets may be configured and stored at the security gateway 170 for a given IoT device or types of IoT devices. At step 618, the security gateway 170 may then inject the JavaScript snippet into the response to enable automatic login at the HTTP client 502.

At step 620, a device authentication dialog box with the pre-filled masked credentials generated by the security gateway 170 via the injected JavaScript snippet is sent to the HTTP client 502. At steps 622 and 624, the HTTP client 502 may attempt an automatic login by sending a login request with the masked credentials. The security gateway 170, at step 626, may unmask the credentials by retrieving the original password from the session map and replacing the masked password with the original password. At step 628, the security gateway 170 may then forward the login request with the unmasked credentials to the device HTTP server 504. Once the device HTTP server 504 receives the login request with correct credentials, it may establish an authentication session with the HTTP client 502 at steps 630 and 634. All activities that occur during the authentication session may be monitored and logged by the security gateway 170 at step 632 for audit purposes by the audit log processing instructions 250. The automatic login 622 at the client device 161 may preserve cookies or other client states to better enable functionality of the web application.

5.3 RTSP Over HTTP Proxy

FIG. 7 illustrates a device access message flow 700 with the security gateway 170 programmed as a Real Time Streaming Protocol (RTSP) over HTTP proxy for accessing IoT devices that stream data in real time. At step 702, a user may use a client device 161 to request the security gateway URI using an HTTP client 502, such as a web browser. A login page to access the security gateway 170 is displayed so the user may enter the enterprise credentials, such as a username and password. Depending on how the security gateway 170 is configured, multi-factor authentication may optionally be used such that users will be asked for additional security information. At step 704, the security gateway 170 authenticates using authentication information stored in a virtual IAM data repository 225.

After the security gateway 170 authenticates the user, the security gateway may use an RBAC list stored in the permissions data repository 270 to generate a list of enterprise devices that the authenticated user is authorized to access and present this list to the user at step 706. Once the user selects an enterprise device 180 from the list of accessible devices at step 708, and the selection is sent in step 710, the security gateway 170 may, at step 712, map the selected enterprise device to a network IP address stored in the devices data repository 240. The IP address may identify a device HTTP server 504 associated with the selected enterprise device 180. The devices data repository 240 may store, for example, a list of devices, IP addresses, URI's, automatic login information, and other relevant information related to the IoT devices.

At step 714, the security gateway 170 may then send an HTTP request to the device HTTP server 504 requesting the homepage. At step 716, the device HTTP server 504 may respond to the request with a 401 status code, or authentication challenge, containing HTML, JavaScript, and CSS code for form-based authentication. Upon receipt of the HTML, JavaScript, and CSS code associated with the authentication challenge, the security gateway 170 may generate a JavaScript snippet using the enterprise device authentication instructions 235. To generate the JavaScript snippet, the security gateway 170 may use pre-configured form elements, such as a login text field ID, a password field ID, and a submit button ID. The security gateway 170 may also automatically include the correct username and generate a masked password to automatically include in the JavaScript snippet. The masked password make be used to hide or encrypt the original password for security purposes. For example, the security gateway 170 may generate a random string that has the same length as the original password to act as the masked password. In addition to the length of the original password, the security gateway 170 may take other password criteria into consideration when generating the masked password such that the field validation will not generate errors and block the form submission. The original password may be mapped to the masked password and stored in a cache. For flexibility, additional JavaScript snippets may be configured at the security gateway 170 for a given IoT device or types of IoT devices. At step 718, the security gateway 170 may then inject the JavaScript snippet into the response to enable automatic login at the HTTP client 502.

At step 720, a device authentication dialog box with the pre-filled masked credentials generated by the security gateway 170 via the injected JavaScript snippet is sent to the HTTP client 502 using the enterprise device authentication instructions 235. At steps 722 and 724, the HTTP client 502 may attempt an automatic login by sending a login request with the masked credentials. The security gateway 170, at step 726, may unmask the credentials by retrieving the original password from the session map and replacing the masked password with the original password. At step 728, the security gateway 170 may then forward the login request with the unmasked credentials to the device HTTP server 504. Once the device HTTP server 504 receive the login request with correct credentials, it may establish an authentication session with the HTTP client 502 at steps 730 and 734. The security gateway 170 may, at step 732 inject additional device information, such as a device name or an IP address of the device HTTP server 504, into the page content before responding.

At step 738, the RTSP request may be initiated by a separate client, such as a browser video player plugin, and tunneled over HTTP for the purposes of avoiding firewalls. When the request from the from the video player 736 is received at the security gateway 170, the security gateway may remove the previously injected device information, such as the device name or IP address at step 740, and forward the RTSP request to the device HTTP server 504 at step 742. From there, video data may be sent from the device HTTP server 504 to the video player 736 at steps 744 and 748, with the security gateway 170 acting as a proxy for forwarding the video data at step 746.

5.4 SSH Access Token Server

FIG. 8 illustrates a device access message flow 800 with the security gateway 170 programmed as a Secure Socket Shell (SSH) access token sever. At step 802, an enterprise device 180 associated with device HTTP server 504 may be registered to the security gateway 170. During registration, the enterprise device credentials, such as an administrator username and password, may be stored at the devices data repository 240. The security gateway 170 may then randomize the administrator password for existing users on the device, generate corresponding private keys, and store these private keys to the blockchain 150 using the credential processing instructions 245. The security gateway 170 may use the credential processing instructions 245 to add a script into the enterprise device that expires and deletes temporary user accounts after a set period of time. The frequency of rotation may be customizable and based on days, weeks, months, years or any other incremental period of time.

At step 804, a user may use a client device 161 to request the security gateway URI using an HTTP client 502, such as a web browser. A login page to access the security gateway 170 is displayed so the user may enter the enterprise credentials, such as a username and password. Depending on how the security gateway 170 is configured, multi-factor authentication may optionally be used such that users will be asked for additional security information. At step 806, the security gateway 170 authenticates using authentication information stored in a virtual IAM data repository 225.

After the security gateway 170 authenticates the user, the security gateway may use an RBAC list stored in the permissions data repository 270 to generate a list of enterprise devices that the authenticated user is authorized to access and present this list to the user at step 808. Once the user selects an enterprise device 180 from the list of accessible devices at step 810, and the selection is sent in step 812, the security gateway 170 may, at step 814, map the selected enterprise device to a network IP address stored in the devices data repository 240. The IP address may identify a device HTTP server 504 associated with the selected enterprise device 180. The devices data repository 240 may store, for example, a list of devices, IP addresses, URI's, automatic login information, and other relevant information related to the IoT devices.

At step 818, the security gateway 170 may clone an existing device user based on the privileges to create a temporary username and password with randomized characters. For example, if a user has administrator privileges, the administrator user will be cloned. The security gateway 170 may also optionally generate an SSH key pair and use SSH to save the public key for that user on the enterprise device 180 at step 820. At step 816, the security gateway may send the randomized username and password and the temporary private key to the HTTP client 502 for display in the UI. The user may then use an SSH client 822 at the command line to login to the enterprise device 180. At step 824, the SSH client may connect directly to the device HTTP server 504 by either adding the private key into the .ssh profile and using the given random username, or by using the random username and password.

If the enterprise device 180 does not have SSH enabled and only has Telnet available, the user may use the temporary username and password in a Telnet session. At step 826, an authentication session is established directly between the device HTTP server 540 and the HTTP client 502.

5.5 SSH Proxy

FIG. 9 illustrates a device access message flow 900 with the security gateway 170 programmed as an SSH proxy when an enterprise device 180 is not directly accessible to the user. At step 902, an enterprise device 180 associated with device HTTP server 504 is registered to the security gateway 170. During registration, the enterprise device credentials, such as an administrator username and password, will be stored at the devices data repository 240. The security gateway 170 may then randomize the administrator password for existing users on the device, generate corresponding private keys, and store these private keys to the blockchain 150 using the credential processing instructions 245. The security gateway 170 may use the credential processing instructions 245 to add a script into the enterprise device that expires and deletes temporary user accounts after a set period of time. The frequency of rotation may be customizable and based on days, weeks, months, years or any other incremental period of time.

At step 904, a user may use a client device 161 to request the security gateway URI using an HTTP client 502, such as a web browser. A login page to access the security gateway 170 is displayed so the user may enter the enterprise credentials, such as a username and password. Depending on how the security gateway 170 is configured, multi-factor authentication may optionally be used such that users will be asked for additional security information. At step 906, the security gateway 170 acts as a jumpbox (that is, a jump server or secure administrative host) with a pluggable authentication module (PAM) to authenticate using authentication information stored in a virtual IAM data repository 225. At step 908, the security gateway 170 may use SSH and present a virtual shell 910 to the authenticated user with a limited set of commands. One such command may be, for example, to display a list of accessible devices for the logged-in user. The list of accessible devices may be based on the local permissions list. After a user selects a device from the list of accessible devices and the selection is sent at step 912, the security gateway 170 may, at step 914, map the selected enterprise device to a network IP address stored in the devices data repository 240. The IP address may identify a device HTTP server 504 associated with the selected enterprise device 180. The devices data repository 240 may store, for example, a list of devices, IP addresses, URI's, automatic login information, and other relevant information related to the IoT devices.

At step 916, the security gateway 170 may clone an existing device user based on the privileges to create a temporary username and password with randomized characters. For example, if a user has administrator privileges, the administrator user will be cloned. The security gateway 170 may also optionally generate an SSH key pair and use SSH to save the public key for that user on the enterprise device 180 at step 918. At step 922, the security gateway 170 may act as an SSH proxy that tunnels SSH commands from the user to the device at step 924 and provides authenticated access to the device for the user at step 920. All activities that occur during the authentication session may also be monitored and logged in the audit log data repository 255 for audit purposes by the audit log processing instructions 250. The activities may also be stored as data in the blockchain 150. At step 928, the security gateway 170 may manage the virtual shell sessions by exiting the virtual shell 910 when the session has been properly terminated in step 926 and deleting the temporary username and the associated public key from the device in step 930. If the enterprise device 180 does not have SSH enabled and only has Telnet available, the user may use the temporary username and password in a Telnet session with the virtual shell.

5.6 SSH Proxy Via HTTP Client

FIG. 10 illustrates a device access message flow 1000 with the security gateway 170 programmed as an SSH proxy via an HTTP client. This approach is similar to the device access message flow 900 except that the user may use an HTTP client 502 to run the SSH session to the security gateway 170 for accessing the enterprise device 180.

At step 1002, an enterprise device 180 associated with device HTTP server 504 is registered to the security gateway 170. During registration, the enterprise device credentials, such as an administrator username and password, will be stored at the devices data repository 240. The security gateway 170 may then randomize the administrator password for existing users on the device, generate corresponding private keys, and store these private keys to the blockchain 150 using the credential processing instructions 245. The security gateway 170 may use the credential processing instructions 245 to add a script into the enterprise device that expires and deletes temporary user accounts after a set period of time.

At step 1004, a user may use a client device 161 to request the security gateway URI using an HTTP client 502, such as a web browser. A login page to access the security gateway 170 is displayed so the user may enter the enterprise credentials, such as a username, password, and/or answers to security questions. Depending on how the security gateway 170 is configured, multi-factor authentication may optionally be used such that users will be asked for additional information. At step 1006, the security gateway 170 authenticates using authentication information stored in a virtual IAM data repository 225.

After the security gateway 170 authenticates the user, the security gateway may use an RBAC list associated with the virtual IAM services to generate a list of enterprise devices that the authenticated user is authorized to access and present this list to the user at step 1008. Once the user selects an enterprise device 180 from the list of accessible devices at step 1010, and the selection is sent in step 1012, the security gateway 170 may, at step 1014, map the selected enterprise device to a network IP address stored in the devices data repository 240. The IP address may identify a device HTTP server 504 associated with the selected enterprise device 180. The devices data repository 240 may store, for example, a list of devices, IP addresses, URI's, automatic login information, and other relevant information related to the IoT devices.

At step 1016, the security gateway 170 may clone an existing device user based on the privileges to create a temporary username and password with randomized characters. For example, if a user has administrator privileges, the administrator user will be cloned. The security gateway 170 may also generate an SSH key pair and use SSH to save the public key for that user on the enterprise device 180 at step 1018. At step 1020, the security gateway 170 may present a web interface for an SSH shell where the virtual shell may be in an inline frame (IFrame).

At step 1026, the security gateway 170 may act as an SSH proxy that tunnels SSH commands from the user to the device at step 1028 and provides authenticated access to the device for the user at step 1024. All activities that occur during the authentication session may also be monitored and logged in the audit log data repository 255 for audit purposes by the audit log processing instructions 250. The activities may also be stored as data in the blockchain 150. At step 1032, the security gateway 170 may manage the virtual shell sessions by exiting the virtual shell in the IFrame 1022 when the session has been properly terminated in step 1030 and deleting the temporary username and the associated public key from the device in step 1034. If the enterprise device 180 does not have SSH enabled and only has Telnet available, the user may use the temporary username and password in a Telnet session with the virtual shell in the IFrame.

5.7 Modbus Proxy

Figure 11:
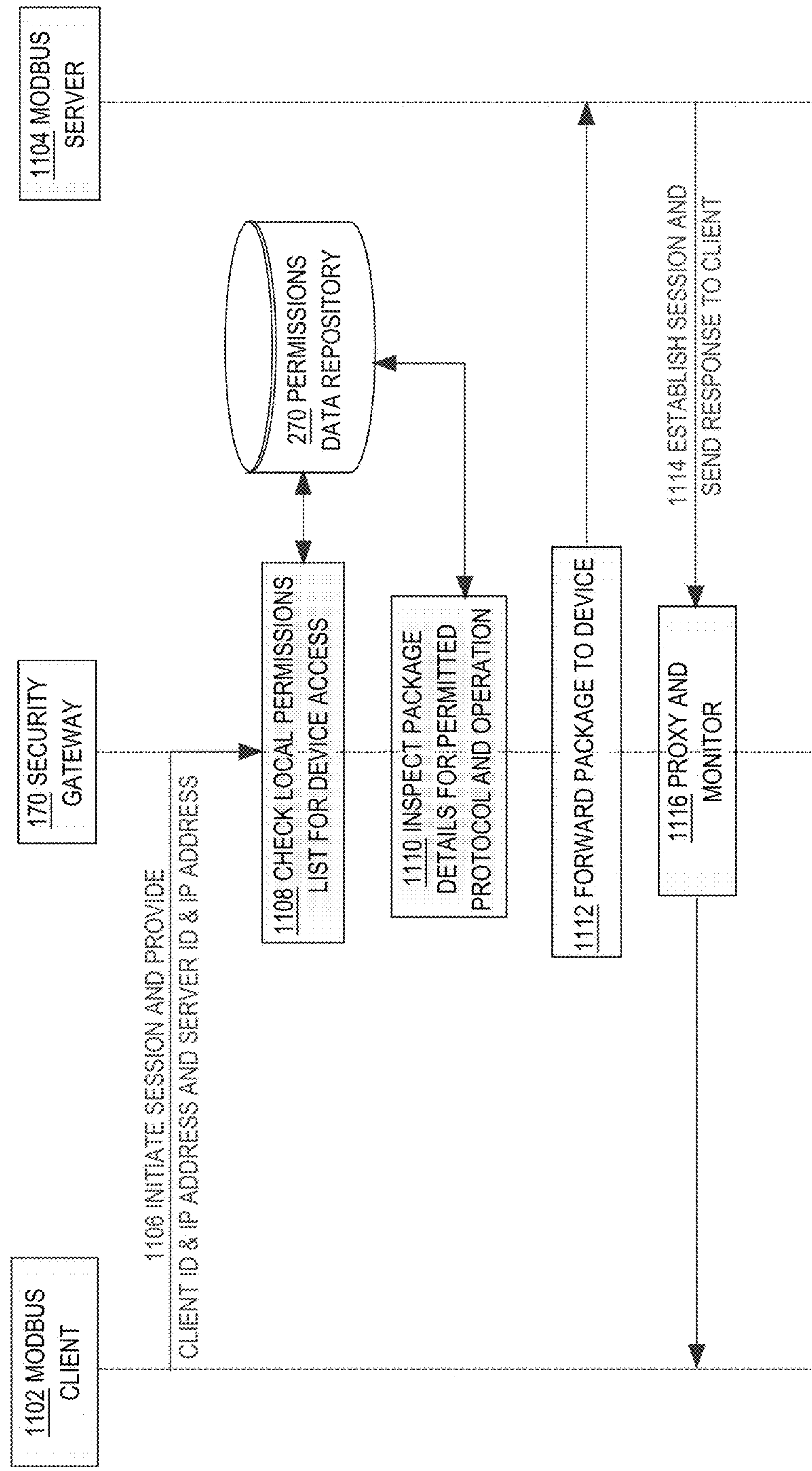
FIG. 11 illustrates a device access message flow with a security gateway as an OT protocols proxy, in an example embodiment.

FIG. 11 illustrates a device access message flow 1100 with the security gateway 170 programmed as Modbus proxy. In step 1106, a Modbus client 1102 may initiate a session with the security gateway 170 by providing a Modbus client ID and IP address and a Modbus server ID and IP address. The Modbus client 1102 may be, for example, a Supervisory Control and Data Acquisition (SCADA) master while the Modbus server 1104 may be, for example, an IoT device. Upon receiving the client and server ID and IP addresses, the security gateway 170 may, at step 1108, use the local permissions list stored in the permissions data repository 270 to regulate access to the requested Modbus server 1104.

For example, the security gateway 170 may check the local permissions list to ensure that the both the Modbus client ID and the Modbus server ID match the client and server ID stored in the permissions data repository 270.

At step 1110, the security gateway 170 may use the local permissions list stored in the permissions data repository 270 to inspect the request packages for the permitted Modbus protocol, in contrast to other protocols. The security gateway 170 may also check for operations, or Modbus function codes, such as reading, writing a single register, and writing multiple registers. The security gateway 170 may also check for the register address. Subsequently, the security gateway 170 may, at step 1112 forward the request packages to the Modbus server 1104. At step 1114, the Modbus server 1104 may establish an authentication session and send a response to the Modbus client 102, which the security gateway 170 proxies at step 1116. All activities that occur during the authentication session may also be monitored and logged in the audit log data repository 255 for audit purposes by the audit log processing instructions 250. The activities may also be stored as data in the blockchain 150.

5.8 OPC UA Proxy

FIG. 12 illustrates a device access message flow 1200 with the security gateway 170 as an Object linking and embedding for Process Control Unified Architecture (OPC UA) proxy. In step 1206, an OPC UA client 1202 may initiate a session with the security gateway 170 and provide OPC UA client credentials and a client IP address, as well as an OPC UA server ID and IP address. The OPC UA client 1202 may be a SCADA master while the OPC UA server 1204 may be and IoT device. The OPC UA client credential may be, for example, a service account and password or a certificate. Upon receiving the client credential and IP address and the server ID and IP address, the security gateway 170 may, at step 1208 use the virtual IAM service instructions 220 and the virtual IAM data repository 225 to authenticate the client credentials. At step 1210, after the client credentials have been authenticated, the security gateway 170 may use the local permissions list stored in the permissions data repository 270 to regulate access to the requested OPC UA server 1204.

At step 1212, the security gateway 170 may then use the permissions list stored in the permissions data repository 270 to inspect the request packages for the permitted OPC UA protocol, in contrast to other protocols. The security gateway 170 may also check for operations, such a reading or writing. The security gateway 170 may then, at step 1214, validate that the client has permission to read or write the requested ItemID's or data tag names. Subsequently, the request package and the client credentials may be forwarded to the OPC UA server at step 1216. At step 1218, the OPC UA server 1204 may establish an authentication session and send a response to the OPC UA client 1202, which the security gateway 170 proxies at step 1220. All activities that occur during the authentication session may also be monitored and logged in the audit log data repository 255 for audit purposes by the audit log processing instructions 250. The activities may also be stored as data in the blockchain 150.

5.9 MQTT Proxy

FIG. 13 illustrates a device access message flow 1300 with the security gateway 170 programmed as a Message Queue Telemetry Transport (MQTT) proxy. At step 1306, an MQTT client 1302 may initiate a session, with the security gateway 170 acting as a proxy, by providing MQTT client credentials and a client IP address, as well as a broker ID and IP address. Upon receiving the client credentials and IP address and the broker ID, the security gateway 170 may, at step 1308, use the virtual TAM service instructions 220 and the virtual TAM data repository 225 to authenticate the client credentials. At step 1310, after the client credentials have been authenticated, the security gateway 170 may use the local permissions list stored in the permissions data repository 270 to regulate access to the requested MQTT broker 1304.

At step 1312, the security gateway 170 may inspect the request packages for the permitted MQTT protocol, in contrast to other protocols that may not be allowed, and check for permitted operations, such whether the device is subscribing or publishing. The security gateway 170 may then, at step 1314, validate that the client has permission to read or write the requested MQTT topics or data tag names. This ensures that protected topics are not inappropriately accessed by devices that should not have access. Subsequently, the request package and the client credentials may be forwarded to the MQTT broker at step 1316. At step 1318, the MQTT Broker 1304 may establish a session and send a response to the MQTT client 1302, which the security gateway 170 proxies at step 1320. All activities that occur during the authentication session may be monitored and logged in the audit log data repository 255 for audit purposes by the audit log processing instructions 250. The activities may also be stored as data in the blockchain 150.

5.10 OT Converter and Aggregator

Figure 14:
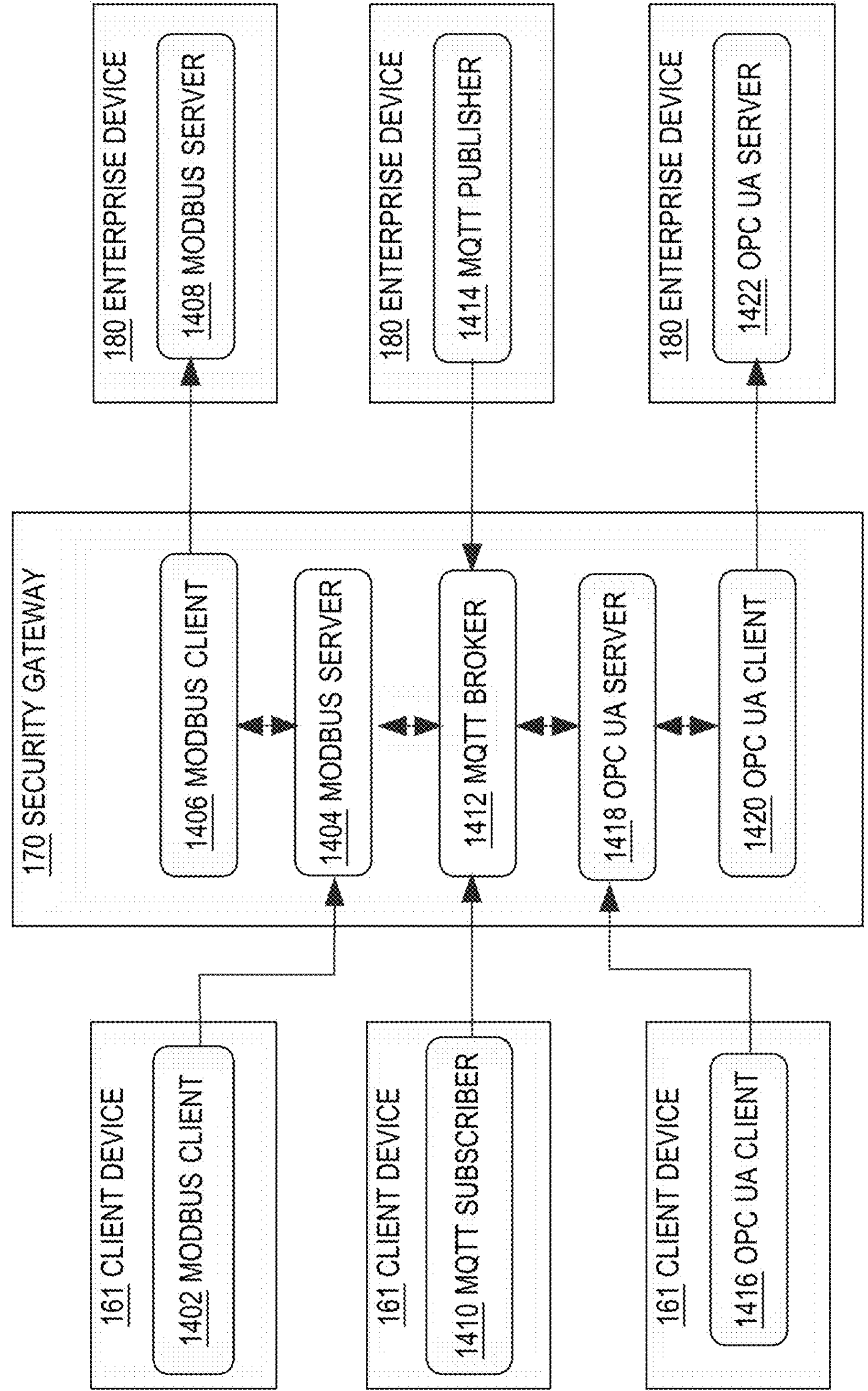
FIG. 14 illustrates a device access message flow with a security gateway as an OT protocol converter and aggregator, in an example embodiment.

FIG. 14 illustrates a device access message flow 1400 with the security gateway 170 programmed as an OT protocol converter and aggregator. Many client devices use different OT protocols, such as Modbus, MQTT, and OPC UA, to communicate. For example, one client device 161 may be a Modbus client 1402, a second client device 161 may be an MQTT subscriber 1410, while a third client device 161 be an OPC UA client 1416. Many enterprise devices also use different protocols to communicate. For example, one enterprise device 180 be a Modbus server 1408, a second enterprise device 180 may be an MQTT publisher 1414, while a third enterprise device 180 may be an OPC UA server 1422.

Traditionally, to communicate with any given enterprise device 180, the client device 161 would have to support the specific communication protocol that the enterprise device 180 uses. Consequently, a client device 161 that needs access to a Modbus server 1408, an MQTT publisher 1414, and a OPC UA server 1422, would need to be programmed to communicate using all three protocols. This places a tremendous processing burden on a single client device 161 to be a Modbus client 1402, an MQTT subscriber 1410, and a UPC UA client 1416 simultaneously. Furthermore, communication protocols such as MQTT lack access regulation, which presents a security risk if all device have access to all topics when only certain device should properly have access to specific topics. Consequently, the security gateway 170 may act as an intermediary between the client device 161 and the enterprise device 180 that eliminates the processing burden on the client device 161 to support these various protocols and simultaneously provides a system of regulating access for increased security.

To function as an intermediary, the security gateway 170 is configured or programmed to incorporate these various protocols. For example, the security gateway 170 may be configured or programmed with both Modbus client 1406 and Modbus server 1404 features such that the security gateway may properly forward requests and responses as a proxy. Similarly, the security gateway 170 may also have OPC UA server 1418 and OPC UA client 1420 function to enable proxying between the OPC UA client 1416 and the OPC UA server 1422. The security gateway 170 may also act as an MQTT broker 1412 that regulates information to and from the MQTT subscriber 1410 and the MQTT publisher 1414 to ensure that access is only given for permitted topic lists. By acting as a global intermediary, the security gateway 170 may validate and control access to individual data topics as needed and may use a short term-historian or a data bus. For example, the security gateway 170 may regulate access by authenticating using the local permissions list stored in the permissions data repository 270 and inspecting package details to allow only permitted protocols and operations.

In an embodiment, the security gateway 170 may also be configured or programmed as a data aggregator and protocol converter that translates data across different protocols. Specifically, the security gateway 170 may gather data from client devices and enterprise devices and then convert the data to be compatible with Modbus, MQTT, and OPC UA protocols. For example, the security gateway 170 may translate a request or data from a device that uses Modbus into MQTT so that a device using MQTT can receive and process the request or data. Specifically, an authentication request from a client device 161 in one particular format (e.g.—Modbus) may be received by the security gateway 170. Subsequently, the security gateway 170 may converted the format of the request into a different format that is used by the enterprise device 180 (e.g.—MQTT). When the reformatted request is forwarded from the security gateway 170 to the enterprise device 180, the enterprise device will be able to process the request. This approach has the benefit of improving computer communication that would otherwise be limited by differences in protocol usage by creating a single authentication portal that incorporates and supports multiple protocols.

The security gateway 170 may have a configuration database which maps source and destination topics or data tags, along with the appropriate conversion if necessary. Such a configuration may be visualized in the example table below:

| Destination | Source |
|---|---|
| MQTT.broker.A1.temperature | Modbus.Client.1.HR.00003 |
| Modbus.Server.1.HR.00001 | OPCUA.Client.1.ws01_wind_speed |
| MQTT.broker.A1.pressure | Modbus.Client.1.HR.00015 * 0.01 |

Using the foregoing techniques, programmed computers may automatically detect, transfer, store, and utilize data in a manner that maximizes data security and data integrity while improving data delivery to and from both client and enterprise computers. Implementations provide for decreased use of network bandwidth and decreased use of processing resources for enterprise servers that no longer provide direct IAM 120 services to numerous users, applications, and/or devices. In other words, by decentralizing the IAM 120 services, network traffic is no longer concentrated at the enterprise server, which results in less network traffic and use of server processing resources.

Furthermore, the approaches disclosed herein improve data security and data integrity. The use of a blockchain 150 protects the integrity of any data stored in the blockchain 150. The nature of the blockchain 150 also ensures that each new block of data is linked to the previous block, creating an improved method of documenting changes and rejecting unapproved changes. Consequently, the blockchain 150 functions as a secure backup for sensitive identity information with high Byzantine fault tolerance.

Improved data security, decreased processing power, and decreased network bandwidth is also provided by the techniques described herein through the use of the security gateway 170 as a single authentication portal. Not only does the security gateway 170 support a variety of different protocols to shift the use of processing resources away from the client devices, but it also authenticates to each enterprise device 180 on behalf of the client device 161, regulates client device access to each enterprise device 180 using a local permissions list, and generates an audit log of all transactions that it proxies. This improves data security of the entire system while decreasing processing resources for both client devices and enterprise devices.

The security gateway 170 logs every transaction to and from each IoT device to track potential security risks and regulates access through the permissions list so that no device has access where it should not. Authenticating each enterprise device 180 on behalf of the client device 161 and generating an audit log that can deny client device access to potentially compromised enterprise devices has the improved benefit of decreasing the use of processing power and network bandwidth. Since the security gateway 170 will no longer send or receive data to and from the compromised device, network traffic to the compromised device will decrease. Processing power that a client device 161 and/or a compromised enterprise device 180 would otherwise use to send or receive data to and from each other will also decrease. Furthermore, using the security gateway 170 to regulate access control decreases client device 161 processing power since the client device 161 no longer needs to self-regulate access control.

Improved data security is further achieved by the approaches disclosed herein through gateway credentials and enterprise device authentication. Enterprise devices often use hardcoded usernames and passwords, which increases the risk of security breaches. However, with the gateway credentials and enterprise device authentication provided by the security gateway 170, gateway credentials may be generated, rotated, and used in place of hardcoded credentials. If an enterprise device 180 were compromised and reset to use the hardcoded credentials, the security gateway 170 would no longer be able to authenticate to the enterprise device 180, and the security gateway 170 may deny of access to and from the compromised device.

6.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 15:
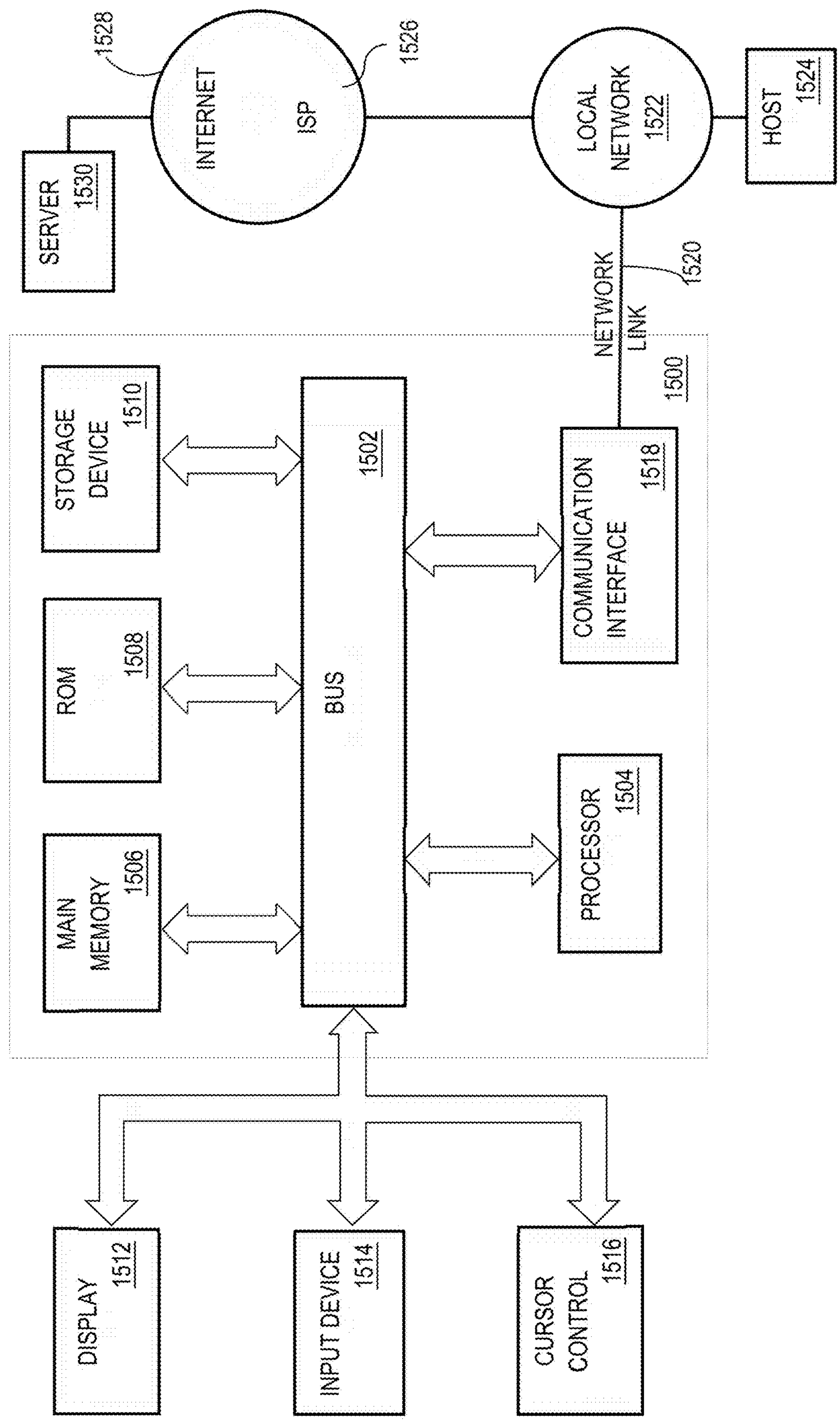
FIG. 15 illustrates a computer system upon which an embodiment of the invention may be implemented.

For example, FIG. 15 is a block diagram that illustrates a computer system upon which an embodiment may be implemented. Computer system 1500 includes a bus 1502 or other communication mechanism for communicating information, and a hardware processor 1504 coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk, optical disk, or solid-state drive is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid-state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:

using a gateway device, receiving an authentication request from a client device;

using the gateway device, in response to receiving the authentication request from the client device, performing one or more authentication services for the client device on behalf of a server device that is separate from the gateway device, by using identity information that is stored in a first data repository;

using the gateway device, generating, based on data from an access control list maintained at the server device, a list of one or more enterprise devices;

using the gateway device, receiving an access request from the client device to access an enterprise device in the list of one or more enterprise devices;

using the gateway device, generating service identity information for authenticating the gateway device to the enterprise device and storing the service identity information in a second data repository;

in response to receiving the access request, using the gateway device, performing one or more authentication services for authenticating the gateway device to the enterprise device on behalf of the client device by using the service identity information that is stored in the second data repository, wherein the service identity information comprises rotating credentials for authenticating the gateway device to the enterprise device; and in response to properly authenticating the gateway device to the enterprise device, allowing the client device to access the enterprise device; in response to not properly authenticating the gateway device to the enterprise device, indicating the enterprise device as compromised.

2. The method of claim 1, further comprising:

in response to performing the one or more authentication services to the enterprise device on behalf of the client device, forwarding the access request from the client device to the enterprise device.

3. The method of claim 1, further comprising:

in response to performing the one or more authentication services to the enterprise device on behalf of the client device, performing one or more of: not forwarding the access request from the client device to the enterprise device, denying access to the enterprise device, or marking the enterprise device as compromised.

4. The method of claim 1, further comprising:

generating and storing, in a third data repository, a transaction record that identifies a timestamp, an actor, a transaction, a severity, and a status based, at least in part, on the authentication request, the one or more authentication services performed on behalf of the server device, or the one or more authentication services performed on behalf of the client device to generate and send a first alert.

5. The method of claim 4, further comprising:

digitally generating a cryptographic hash value over the transaction record;

storing the transaction record and a first copy of the hash value in association with one another in the third data repository; and storing the transaction record and a second copy of the hash value in association with one another as data values in a blockchain.

6. The method of claim 5, further comprising:

comparing the first copy of the hash value of the transaction record that is stored in the third data repository with the second copy of the hash value of the transaction record that is stored as data values in the blockchain and generating a second alert when the first copy of the hash value is not the same as the second copy of the hash value.

7. The method of claim 4, further comprising:

retrieving access control data from the server device;

generating and storing permissions data in a fourth data repository based on the access control data; and wherein generating the list of one or more enterprise devices further comprises generating the list of one or more enterprise devices based on the permissions data stored in the fourth data repository.

8. One or more non-transitory computer-readable storage media storing one or more sequences of program instructions which, when executed by one or more computing devices, cause performing:

using a gateway device, receiving an authentication request from a client device;

using the gateway device, in response to receiving the authentication request from the client device, performing one or more authentication services for the client device on behalf of a server device that is separate from the gateway device, by using identity information that is stored in a first data repository;

using the gateway device, generating, based on data from an access control list maintained at the server device, a list of one or more enterprise devices;

using the gateway device, receiving an access request from the client device to access an enterprise device in the list of one or more enterprise devices;

using the gateway device, generating service identity information for authenticating the gateway device to the enterprise device and storing the service identity information in a second data repository;

in response to receiving the access request, using the gateway device, performing one or more authentication services for authenticating the gateway device to the enterprise device on behalf of the client device by using the service identity information that is stored in the second data repository, wherein the service identity information comprises rotating credentials for authenticating the gateway device to the enterprise device; and in response to properly authenticating the gateway device to the enterprise device, allowing the client device to access the enterprise device; in response to not properly authenticating the gateway device to the enterprise device, indicating the enterprise device as compromised.

9. The one or more non-transitory computer-readable storage media of claim 8, further comprising instructions that, when executed by one or more computing devices, cause:

in response to performing the one or more authentication services to the enterprise device on behalf of the client device, forwarding the access request from the client device to the enterprise device.

10. The one or more non-transitory computer-readable storage media of claim 8, further comprising instructions that, when executed by one or more computing devices, cause:

in response to performing the one or more authentication services to the enterprise device on behalf of the client device, performing one or more of: not forwarding the access request from the client device to the enterprise device, denying access to the enterprise device, or marking the enterprise device as compromised.

11. The one or more non-transitory computer-readable storage media of claim 8, further comprising instructions that, when executed by one or more computing devices, cause:

mapping, based on the access control list, the client device to a permissions level for each enterprise device in the list of one or more enterprise devices.

12. The one or more non-transitory computer-readable storage media of claim 8, wherein receiving the authentication request from the client device and performing the one or more authentication services for the enterprise device on behalf of the client device comprise using Secure Socket Shell (SSH), Telnet, Hypertext Transfer Protocol (HTTP) basic authentication, or HTTP form-based authentication.

13. The one or more non-transitory computer-readable storage media of claim 8, further comprising instructions that, when executed by one or more computing devices, cause:

retrieving access control data from the server device;

generating and storing permissions data in a fourth data repository based on the access control data; and wherein generating the list of one or more enterprise devices further comprises generating the list of one or more enterprise devices based on the permissions data stored in the fourth data repository.

14. A computer system comprising:

one or more processors;

a computer-readable storage media coupled to the one or more processors;

a memory coupled to the computer-readable storage media and storing instructions which, when executed, cause the one or more processors to:

receive an authentication request from a client device;

in response to receiving the authentication request from the client device, perform one or more authentication services for the client device on behalf of a server device that is separate from the computer system, by using identity information that is stored in a first data repository;

generate, based on data from an access control list maintained at the server device, a list of one or more enterprise devices;

receive an access request from client device to access an enterprise device in the list of one or more enterprise devices;

generate service identity information for authenticating a gateway device to the enterprise device and store the service identity information in a second data repository;

in response to receiving the access request, perform one or more authentication services for authenticating the gateway device to the enterprise device on behalf of the client device by using the service identity information that is stored in the second data repository, wherein the service identity information comprises rotating credentials for authenticating the gateway device to the enterprise device; and in response to properly authenticating the gateway device to the enterprise device, allow the client device to access the enterprise device: in response to not properly authenticating the gateway device to the enterprise device, indicate the enterprise device as compromised.

15. The computer system of claim 14, wherein the memory comprises further instructions which, when executed, cause the one or more processors to:

in response to performing the one or more authentication services to the enterprise device on behalf of the client device, forward the access request from the client device to the enterprise device.

16. The computer system of claim 14, wherein receiving the authentication request from the client device and performing the one or more authentication services to the enterprise device on behalf of the client device comprise using SSH, Telnet, HTTP basic authentication, or HTTP form-based authentication.

17. The computer system of claim 14, wherein the memory comprises further instructions which, when executed, cause the one or more processors to:

map, based on the access control list, the client device to a permissions level for each enterprise device in the list of one or more enterprise devices.

18. The computer system of claim 14, wherein the memory comprises further instructions which, when executed, cause the one or more processors to:

generate and store, in a third data repository, a transaction record that identifies a timestamp, an actor, a transaction, a severity, and a status based, at least in part, on the authentication request, the one or more authentication services performed on behalf of the server device, or the one or more authentication services performed on behalf of the client device to generate and send an alert.

19. The computer system of claim 18, wherein the memory comprises further instructions which, when executed, cause the one or more processors to:

digitally generate a cryptographic hash value over the transaction record;

store the transaction record and a first copy of the hash value in association with one another in the third data repository; and store the transaction record and a second copy of the hash value in association with one another as data values in a blockchain.

20. The computer system of claim 19, wherein the memory comprises further instructions which, when executed, cause the one or more processors to:

comparing the first copy of the hash value of the transaction record that is stored in the third data repository with the second copy of the hash value of the transaction record that is stored as data values in the blockchain and generating an alert when the first copy of the hash value is not the same as the second copy of the hash value.

21. A computer-implemented method, comprising:

using a network device, receiving an authentication request from a client device;

using the network device, in response to receiving the authentication request from the client device, performing one or more authentication services for the client device on behalf of a server device that is separate from the network device, by using identity information that is stored in a first data repository; and using the network device, generating, based on data from an access control list maintained at the server device, a list of one or more enterprise devices;

using the network device, receiving an access request from the client device to access an enterprise device in the list of one or more enterprise devices;

using the network device, performing one or more authentication services for authenticating the network device on behalf of the client device by using service identity information that is stored in a second data repository to authenticate the network device to the enterprise device, wherein the service identity information comprises rotating credentials for authenticating the network device to the enterprise device; and in response to properly authenticating the network device to the enterprise device, allowing the client device to access the enterprise device; in response to not properly authenticating the network device to the enterprise device, marking the enterprise device as compromised.

22. The method of claim 21, further comprising:

in response to performing the one or more authentication services to the enterprise device on behalf of the client device, forwarding the access request from the client device to the enterprise device.

23. The method of claim 22, further comprising:

generating and storing, in a third data repository, a transaction record that identifies a timestamp, an actor, a transaction, a severity, and a status based, at least in part, on the authentication request, the one or more authentication services performed on behalf of the server device, or the one or more authentication services performed on behalf of the client device to generate and send a first alert.

24. The method of claim 23, further comprising:

digitally generating a cryptographic hash value over the transaction record;

storing the transaction record and a first copy of the hash value in association with one another in the third data repository; and storing the transaction record and a second copy of the hash value in association with one another as data values in a blockchain.

25. The method of claim 22, further comprising:

translating the authentication request from the client device into a format compatible with the enterprise device, and wherein forwarding the access request from the client device to the enterprise device comprises forwarding the translated request.

26. The method of claim 22, wherein performing the one or more authentication services on behalf of the server device comprises performing one or more authentication services using a first protocol, and wherein performing the one or more authentication services on behalf of the client device comprises performing one or more authentication services using a second protocol, wherein the first protocol and the second protocol are different.

27. The method of claim 22, wherein receiving the authentication request from the client device and performing the one or more authentication services on behalf of the client device comprise using Modbus, Message Queue Telemetry Transport (MQTT), or Open Platform Communications Unified Architecture (OPC UA).

* * * * *